US009451488B2

(12) United States Patent
Park et al.

(10) Patent No.: US 9,451,488 B2
(45) Date of Patent: Sep. 20, 2016

(54) METHOD AND APPARATUS FOR CHANNEL STATE INFORMATION FEEDBACK IN WIRELESS COMMUNICATION SYSTEM

(71) Applicant: LG ELECTRONICS INC., Seoul (KR)

(72) Inventors: Jonghyun Park, Anyang-si (KR); Seungmin Lee, Anyang-si (KR); Kijun Kim, Anyang-si (KR); Hanbyul Seo, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/371,153

(22) PCT Filed: Jan. 21, 2013

(86) PCT No.: PCT/KR2013/000464
§ 371 (c)(1),
(2) Date: Jul. 8, 2014

(87) PCT Pub. No.: WO2013/109110
PCT Pub. Date: Jul. 25, 2013

(65) Prior Publication Data
US 2015/0003271 A1 Jan. 1, 2015

Related U.S. Application Data

(60) Provisional application No. 61/589,283, filed on Jan. 20, 2012, provisional application No. 61/591,841, filed on Jan. 27, 2012, provisional application No. 61/597,728, filed on Feb. 11, 2012, provisional application No. 61/608,094, filed on Mar. 7, 2012.

(51) Int. Cl.
*H04L 12/26* (2006.01)
*H04W 24/08* (2009.01)
(Continued)

(52) U.S. Cl.
CPC ............ *H04W 24/08* (2013.01); *H04L 5/0048* (2013.01); *H04L 5/0082* (2013.01);
(Continued)

(58) Field of Classification Search
CPC . H04W 24/08; H04W 72/042; H04W 24/10; H04W 52/16; H04W 52/40; H04L 1/00; H04L 5/0048; H04L 5/0082; H04L 5/0091; H04L 5/001; H04L 5/0023; H04L 5/0035; H04L 5/0057; H04L 1/003; H04L 1/0026; H04J 1/003; H04J 11/005; H04B 7/0452; H04B 7/0645; H04B 7/024
See application file for complete search history.

(56) References Cited

U.S. PATENT DOCUMENTS 8,472,539 B2 * 6/2013 Ko .................. H04L 5/0023
375/260
8,537,911 B2 * 9/2013 Sayana .............. H04L 5/0048
341/173
(Continued)

FOREIGN PATENT DOCUMENTS

JP      2011-082709      4/2011

OTHER PUBLICATIONS

Cho, "LTE-Advanced," Nokia Siemens Networks, Oct. 2011, 56 pages.
(Continued)

*Primary Examiner* — Brian O'Connor
(74) *Attorney, Agent, or Firm* — Lee, Hong, Degerman, Kang & Walmey; Jonathan Kang; Michael Monaco

(57) ABSTRACT

The present invention relates to a wireless communication system, and more specifically, disclosed are a method and an apparatus for channel state information feedback. A method for a user equipment reporting channel state information in the wireless communication system, according to one embodiment of the present invention, comprises: receiving information on a CSI-reference signal (CSI-RS)-related parameter; receiving the CSI-RS on the basis of the CSI-RS-related parameter; and reporting to the base station CSI feedback information generated on the basis of the CSI-RS, wherein the CSI-RS-related parameter can be applied as a CSI-RS port or a port group unit, wherein an independent CSI-RS transmission power ratio indication parameter can be provided for each subframe set.

13 Claims, 15 Drawing Sheets

(51) Int. Cl.
*H04L 5/00* (2006.01)
*H04W 72/04* (2009.01)
*H04L 27/26* (2006.01)
*H04W 24/10* (2009.01)
*H04B 7/02* (2006.01)
*H04B 7/06* (2006.01)

(52) U.S. Cl.
CPC ........ *H04L 5/0091* (2013.01); *H04L 27/2613* (2013.01); *H04W 72/042* (2013.01); *H04B 7/024* (2013.01); *H04B 7/063* (2013.01); *H04B 7/0632* (2013.01); *H04B 7/0639* (2013.01); *H04L 5/001* (2013.01); *H04L 5/0023* (2013.01); *H04L 5/0035* (2013.01); *H04L 5/0057* (2013.01); *H04W 24/10* (2013.01)

(56) References Cited

U.S. PATENT DOCUMENTS

| | | | | |
|---|---|---|---|---|
| 8,565,066 B2* | 10/2013 | Nam | ...................... | H04L 1/1854 370/215 |
| 8,599,762 B2* | 12/2013 | Kwon | ................... | H04W 52/16 370/328 |
| 8,744,504 B2* | 6/2014 | Faccin | ................. | H04B 7/0413 375/299 |
| 8,824,979 B2* | 9/2014 | Yavuz | ................... | H04L 5/0005 455/114.2 |
| 8,861,430 B2* | 10/2014 | Liao | ..................... | H04B 7/0626 370/318 |
| 8,983,391 B2* | 3/2015 | Khoshnevis | ........ | H04W 52/242 370/330 |
| 8,995,293 B2* | 3/2015 | Jongren | ................ | H04W 24/10 370/252 |
| 9,014,020 B2* | 4/2015 | Gao | ....................... | H04W 48/12 370/252 |
| 9,173,123 B2* | 10/2015 | Miki | ..................... | H04L 5/0053 |
| 2010/0254471 A1* | 10/2010 | Ko | ......................... | H04L 5/0023 375/260 |
| 2011/0274047 A1* | 11/2011 | Kwon | ................... | H04W 52/40 370/328 |
| 2014/0286219 A1* | 9/2014 | Siomina | .............. | H04J 11/0023 370/311 |

OTHER PUBLICATIONS

PCT International Application No. PCT/KR2013/000464, Written Opinion of the International Searching Authority dated May 30, 2013, 1 page.

LTE, Evolved Universal Terrestrial Radio Access (E-UTRA); Physical layer procedures (3GPP TS 36.213 version 10.1.0 Release 10), ETSI TS 136 213 V10.1.0, Apr. 2011, 118 pages.

* cited by examiner

US 9,451,488 B2

METHOD AND APPARATUS FOR CHANNEL STATE INFORMATION FEEDBACK IN WIRELESS COMMUNICATION SYSTEM

CROSS-REFERENCE TO RELATED APPLICATIONS

This application is the National Stage filing under 35 U.S.C. 371 of International Application No. PCT/KR2013/000464, filed on Jan. 21, 2013, which claims the benefit of U.S. Provisional Application Ser. No. 61/589,283, filed on Jan. 20, 2012, 61/591,841, filed on Jan. 27, 2012, 61/597,728, filed on Feb. 11, 2012, and 61/608,094, filed on Mar. 7, 2012, the contents of which are all hereby incorporated by reference herein in their entirety.

TECHNICAL FIELD

The following description relates to a wireless communication system and, more particularly, to a method and apparatus for feeding back channel state information.

BACKGROUND ART

When an eNB transmits a specific signal known to both the eNB and a UE through a downlink channel in order to check downlink channel state, the UE can estimate the downlink channel state through the specific signal and feed back the estimation result to the eNB. This specific signal is referred to as a reference signal (RS) and a reference signal for measuring/estimating a channel may be referred to as a channel state information-reference signal (CSI-RS).

In conventional wireless communication systems, a single CSI-RS configuration is provided to a UE and the same parameter value is applied to all CSI-RS ports included in the CSI-RS configuration.

In enhanced wireless communication systems which need to support multi-cell coordinated transmission and/or improved inter-cell interference coordination, CSI-RSs from a plurality of transmission points may be transmitted to a single UE and subframes may have different interference characteristics. Accordingly, when CSI-RS configurations and CSI feedback schemes, defined in the conventional wireless communication systems, are applied to the enhanced wireless communication systems, a UE cannot correctly perform CSI feedback or cannot report a correct channel state. Therefore, there is need for a new method for performing CSI feedback correctly and efficiently in enhanced wireless communication systems.

DISCLOSURE

Technical Problem

An object of the present invention devised to solve the problem lies in a method for independently applying a CSI-RS related parameter per antenna port, antenna port group, subframe and subframe set. Another object of the present invention is to provide a method for signaling CSI-RS related parameters of various properties individually or in a group. Still another object of the present invention is to provide a method for reporting CSI feedback in a flexible feedback reporting unit.

The technical problems solved by the present invention are not limited to the above technical problems and those skilled in the art may understand other technical problems from the following description.

Technical Solution

The object of the present invention can be achieved by providing a method for reporting channel state information (CSI) by a user equipment (UE) in a wireless communication system, including: receiving information on a CSI-reference signal (CSI-RS) related parameter; receiving a CSI-RS on the basis of the CSI-RS related parameter; and reporting, to a base station (BS), CSI feedback information generated on the basis of the CSI-RS, wherein the CSI-RS related parameter is applied to one or more CSI-RS ports included in a CSI-RS configuration, wherein the CSI-RS related parameter includes a plurality of $P_c$ parameters indicating the ratio of CSI-RS energy per resource element (ERPE) to physical downlink shared channel (PDSCH) EPRE.

In another aspect of the present invention, provided herein is a UE reporting CSI, including: a receiver; a transmitter; and a processor, wherein the processor is configured to receive information on a CSI-RS related parameter through the receiver, to receive a CSI-RS on the basis of the CSI-RS related parameter through the receiver and to report, to a BS through the transmitter, CSI feedback information generated on the basis of the CSI-RS, wherein the CSI-RS related parameter is applied to one or more CSI-RS ports included in a CSI-RS configuration, wherein the CSI-RS related parameter includes a plurality of $P_c$ parameters indicating the ratio of CSI-RS ERPE to PDSCH EPRE.

The following can be commonly applied to the aforementioned embodiments according to the present invention.

The plurality of $P_c$ parameters may include first and second $P_c$ parameters, the first and second $P_c$ parameters may be respectively applied to first and second subframe sets, and the first and second subframe sets may have different interference characteristics.

The CSI-RS related parameter may be independently applied per CSI-RS port or antenna port group included in the CSI-RS configuration.

The CSI-RS related parameter may be independently applied to each of a plurality of sub-resources included in the CSI-RS configuration and each sub-resource may be identified by a position of a resource element to which the CSI-RS is mapped.

The CSI-RS related parameter may be applied as the same value to ports corresponding to a transmission port (TP) or a TP group, from among the one or more CSI-RS ports included in the CSI-RS configuration.

When a plurality of CSI-RS configurations are provided to the UE, the CSI-RS related parameter may be independently applied to each of the plurality of CSI-RS configurations.

When a plurality of CSI processes are configured for the UE, the CSI-RS related parameter may be independently applied to each of the plurality of CSI processes.

The CSI-RS related parameter may include one or a combination of two or more of a scrambling seed value used to generate a CSI-RS sequence, a timing offset used to generate the CSI-RS sequence and a parameter indicating a resource element position in which the CSI-RS is present.

An initial value used to generate the CSI-RS sequence may be $c_{init}$, wherein $c_{init}=2^{10} \cdot (7 \cdot (\mathrm{mod}((n_s \Delta n_s), 20)+1)+l+1) \cdot (2 \cdot X_{ID}^{cell}+1) + 2 \cdot X_{ID}^{cell} + N_{CP}$ wherein $n_s$ is a slot number in a radio frame, $\Delta n_s$ denotes the timing offset used to generate the CSI-RS sequence, l is an OFDM symbol number in a slot, $X_{ID}^{cell}$ represents the scrambling seed value used to generate the CSI-RS sequence, $N_{CP}$ is 1 in case of normal cyclic prefix (CP) and 0 in case of extended CP, and mod denotes a modulo operation.

The information on the CSI-RS related parameter may include a flag bit for each of the CSI-RS ports included in the CSI-RS configuration, and the flag bit for CSI-RS port p may indicate whether the CSI-RS related parameter for CSI-RS port p−1 is equally applied to CSI-RS port p.

The flag bit may be defined for each of the CSI-RS related parameters or a set of the CSI-RS related parameters.

The CSI feedback information may be configured as one CSI feedback report unit for one CSI-RS configuration.

When a plurality of CSI-RS configurations are provided to the UE, the CSI feedback information may be configured as one CSI feedback report unit for the plurality of CSI-RS configurations.

The information on the CSI-RS related parameter may be received through higher layer signaling.

It is to be understood that both the foregoing general description and the following detailed description are merely exemplary of the invention, and are intended to provide an overview or framework for understanding the nature and character of the invention as it is claimed.

Advantageous Effects

According to the present invention, it is possible to provide a method for independently applying a CSI-RS related parameter per antenna port, antenna port group, subframe and subframe set. In addition, it is possible to provide a method for signaling CSI-RS related parameters of various properties individually or in a group. Furthermore, it is possible to provide a method for reporting CSI feedback in a flexible feedback reporting unit.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
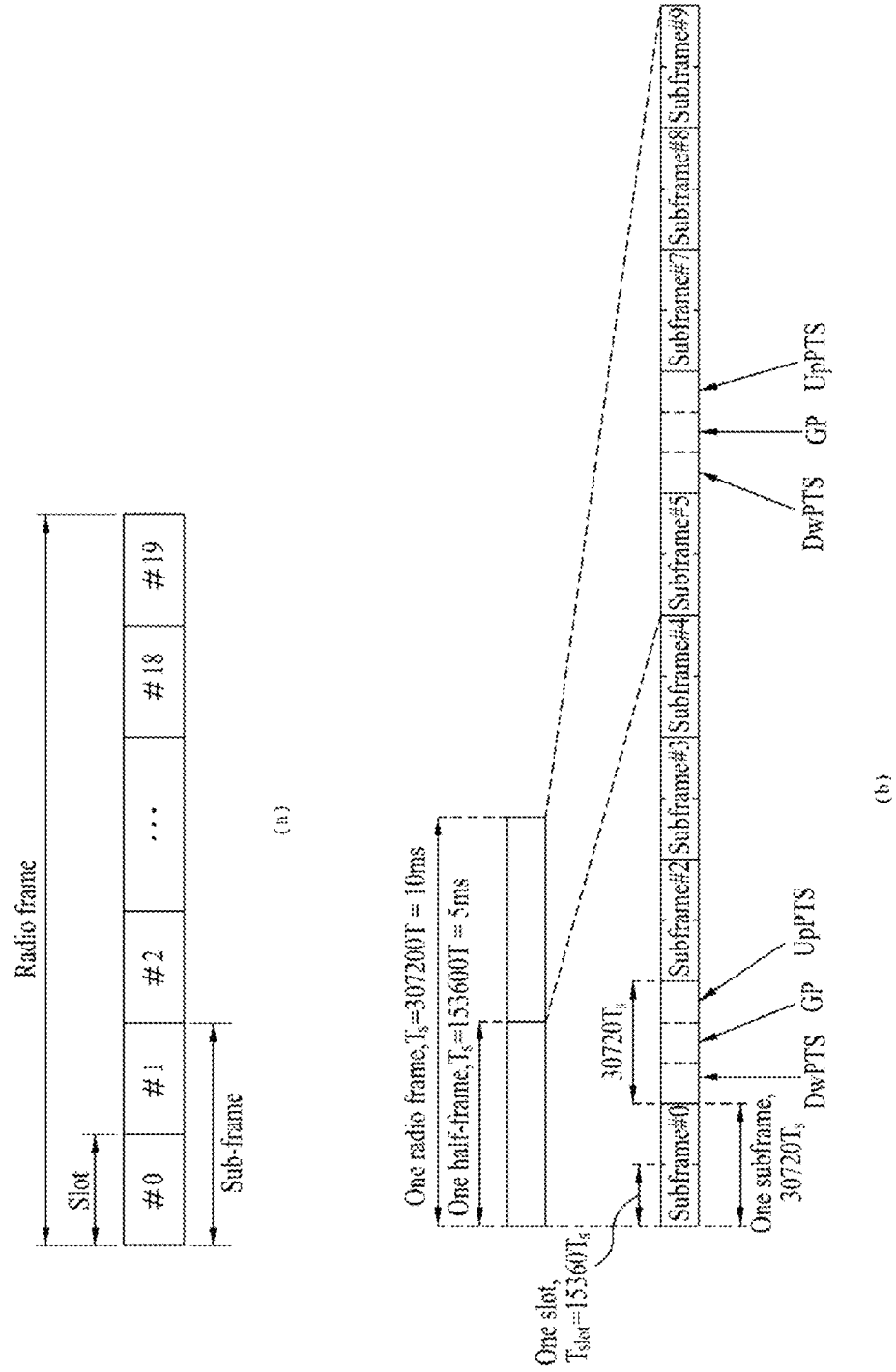
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
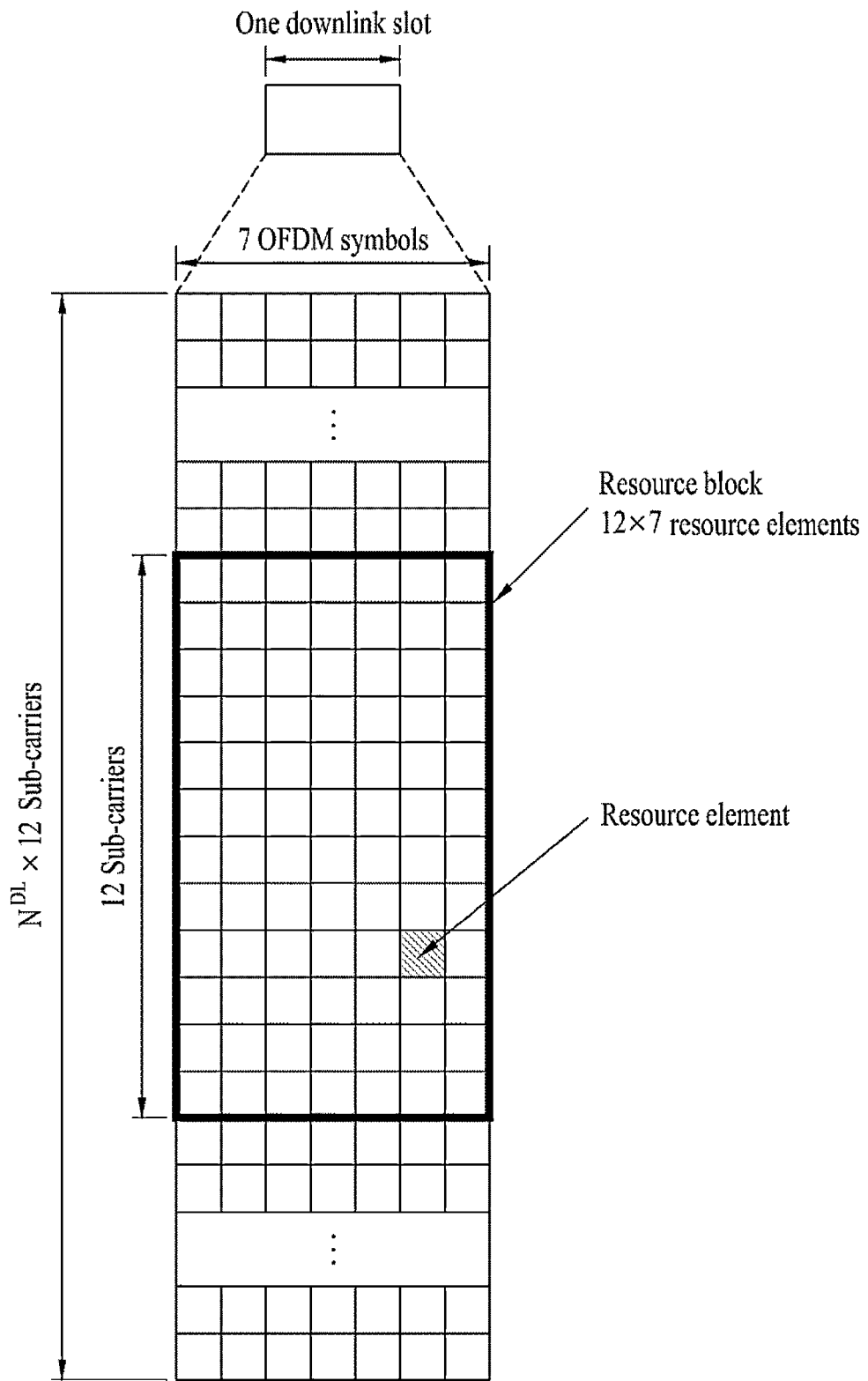
FIG. 2 illustrates a resource grid.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
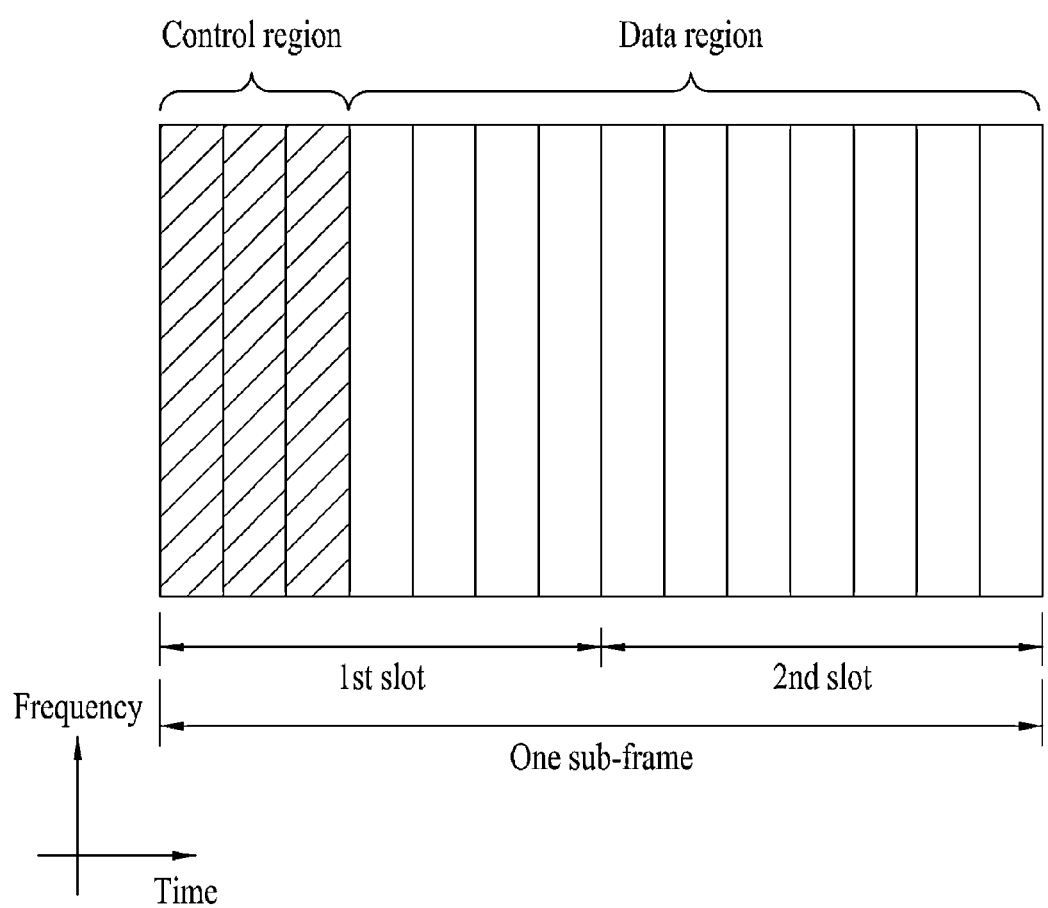
FIG. 3 illustrates a downlink subframe structure.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI- RNTI) may be masked to the CRC. To indicate a random access response corresponding to a response to transmission of a random access preamble of the UE, a random access-RNTI (RA-RNTI) may be masked to the CRC.

Figure 4:
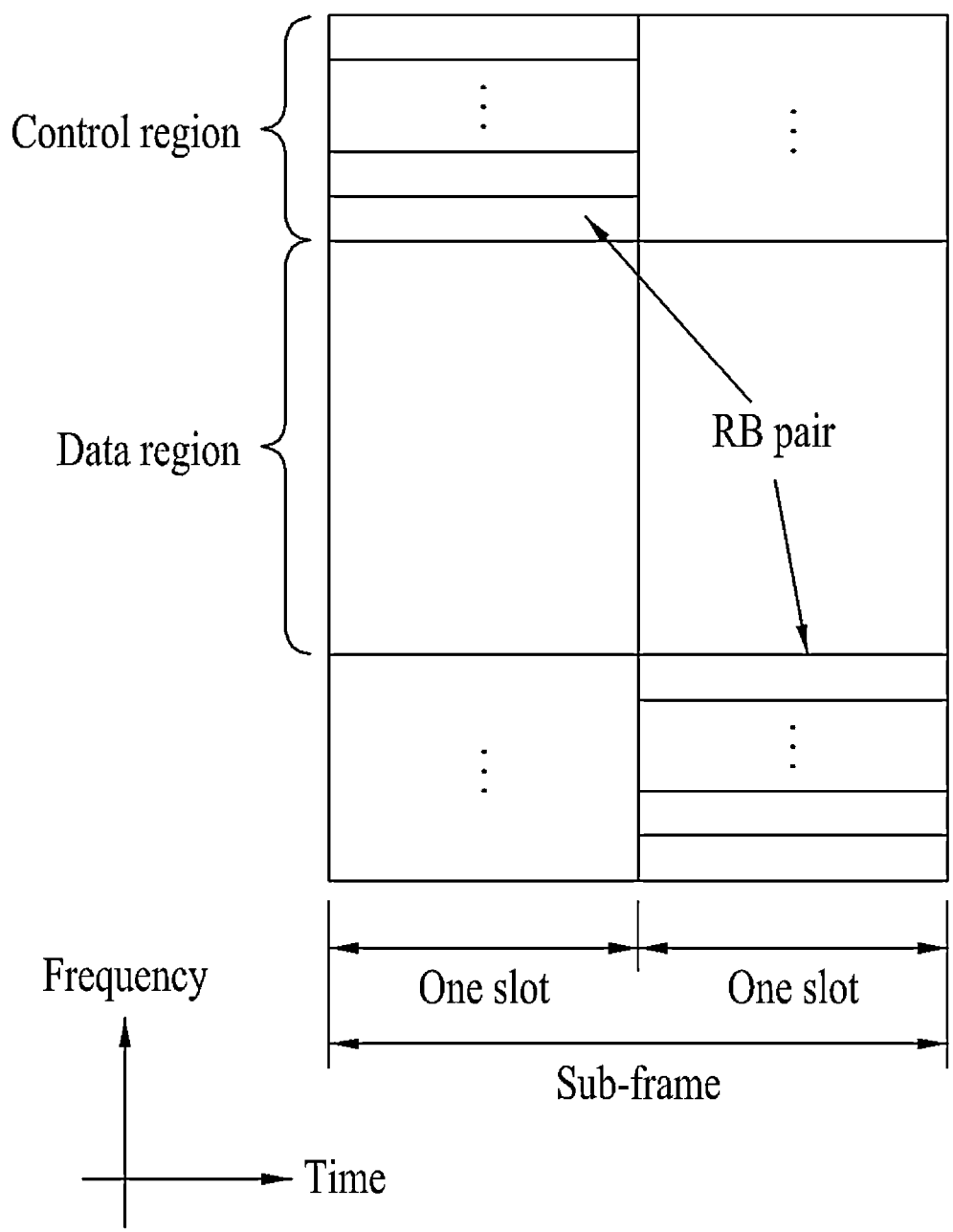
FIG. 4 illustrates an uplink subframe structure.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals. The CRS is used to estimate a channel of a physical antenna and can be commonly received by all UEs in a cell. The CRS is distributed in the entire band. The CRS can be used for CSI acquisition and data demodulation.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS). The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

Figure 5:
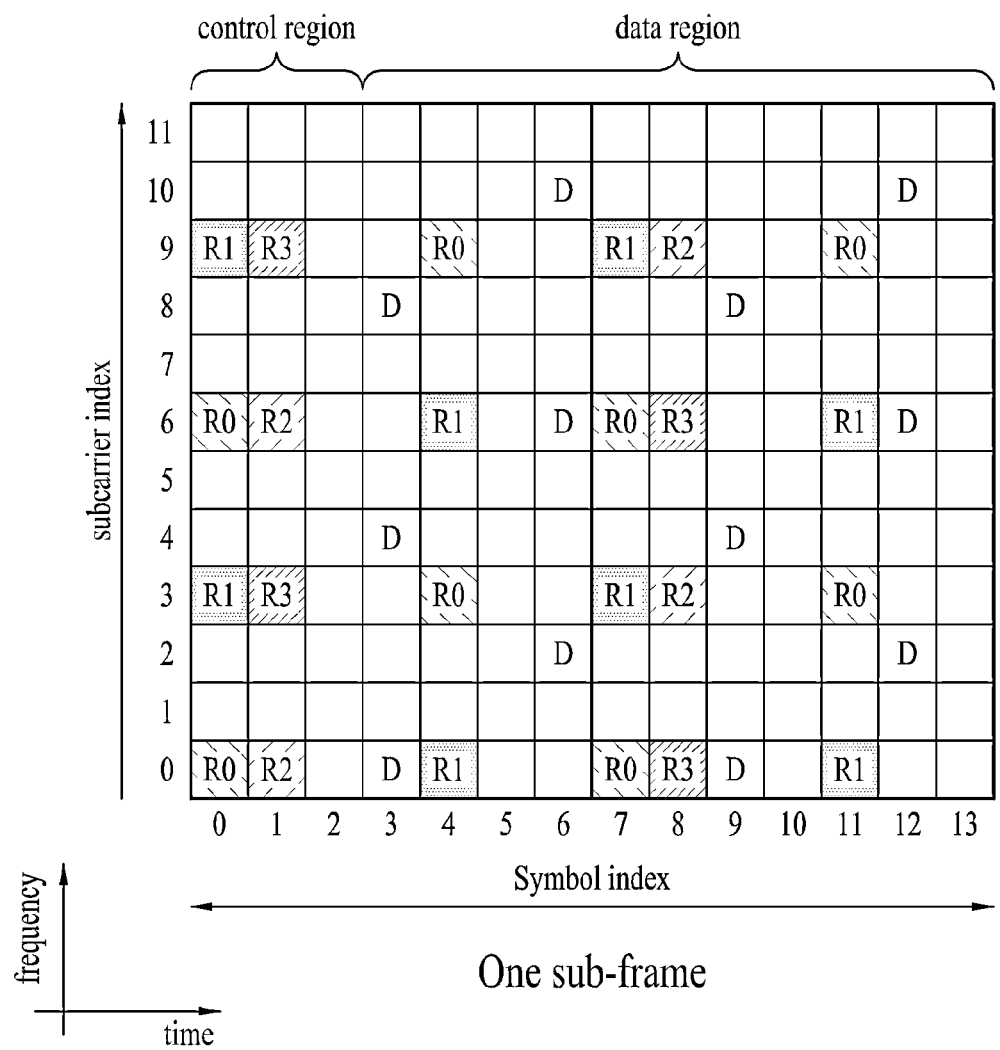
FIG. 5 illustrates a downlink reference signal.

FIG. 5 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP and has a length of 12 OFDM symbols in the case of extended CP in the time domain. FIG. 5 shows RB pairs in the case of normal CP.

FIG. 5 shows RS positions in RB pairs in a system in which an eNB supports 4 transmit antennas. In FIG. 5, REs indicated by 'R0', 'R1', 'R2' and 'R3' respectively represent CRS positions with respect to antenna port indices 0, 1, 2 and 3. An RE indicated by 'ID' represents a DRS position.

LTE-A evolving from 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8). For example, UE-specific reference signal ports supporting a maximum of 8 Tx antenna ports can be defined by antenna port numbers 7 to 12 and a UE-specific reference signal can be transmitted in an RE position that does not overlap with other reference signals.

Figure 6:
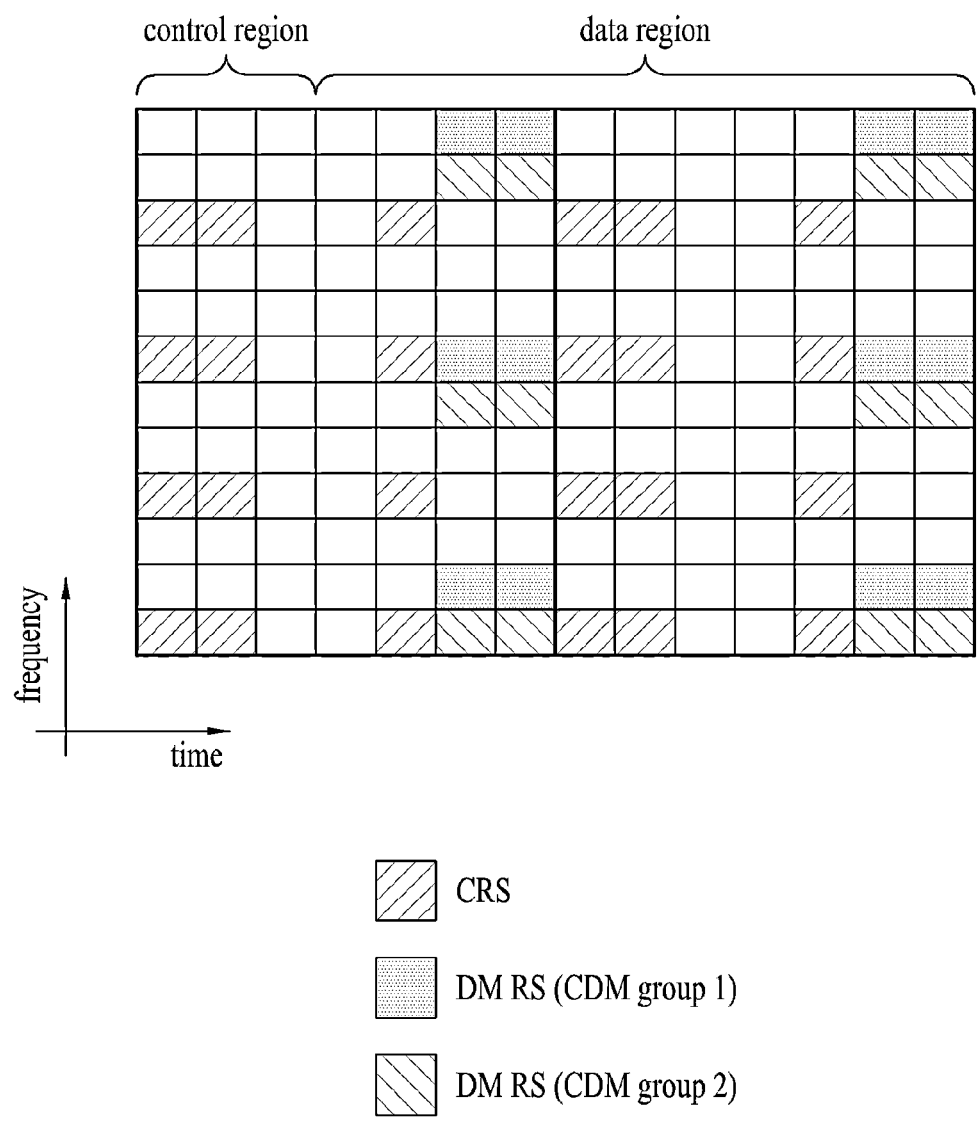
FIG. 6 illustrates an exemplary DMRS pattern defined in LTE-A.

FIG. 6 illustrates an exemplary DMRS pattern defined in LTE-A.

FIG. 6 shows the position of an RE through which a DMRS is transmitted on one RB pair (14 OFDM symbols in the time domain×12 subcarriers in the frequency domain in the case of normal CP) through which downlink data is transmitted. DMRSs can be transmitted for 8 antenna ports (antenna port indices 7 to 14) additionally defined in LTE-A. DMRSs with respect to different antenna ports can be identified by being located in different frequency resources (subcarriers) and/or different time resources (OFDM symbols) (i.e. multiplexed according to FDM and/or TDM). In addition, DMRSs with respect to different antenna ports, which are located in the same time-frequency resource, can be identified using an orthogonal code (i.e. multiplexed according to CDM).

In LTE-A, an RS related to feedback of CSI such as CQI/PMI/RI for a new antenna port may be defined as a CSI-RS. For example, CSI-RS ports supporting a maximum of 8 Tx antenna ports can be defined by antenna port numbers 15 to 22 and the CIS-RS can be transmitted in an RE position that does not overlap with other reference signals.

Figure 7:
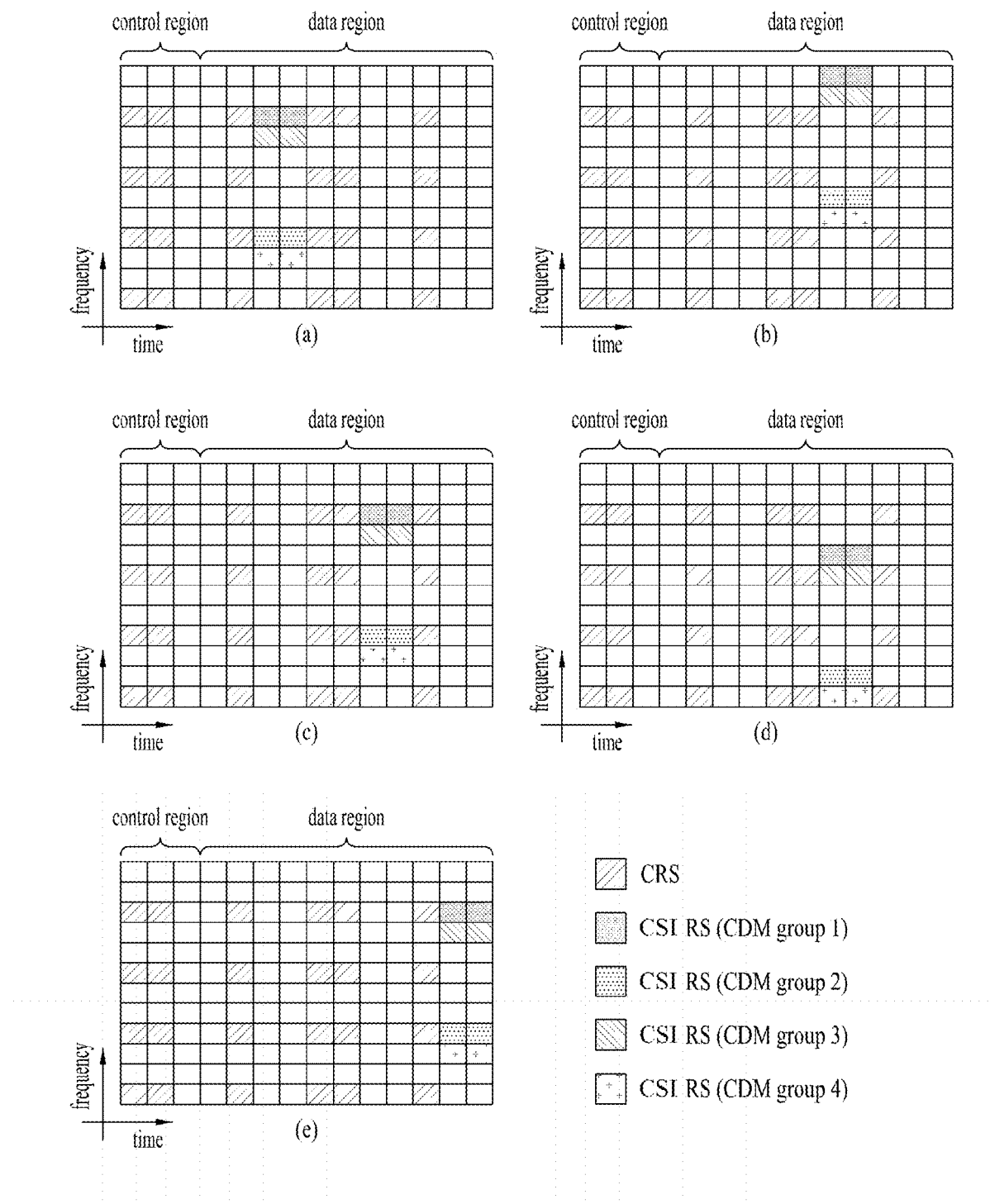
FIG. 7 illustrates exemplary CSI-RS patterns defined in LTE-A.

FIG. 7 illustrates exemplary CSI-RS patterns defined in LTE-A. FIG. 7 shows positions of REs on which CSI-RSs are transmitted on one RB pair (14 OFDM symbols in the time domain×12 subcarriers in the frequency domain in the case of normal CP) through which downlink data is transmitted. One of CSI-RS patterns of FIGS. 7(a) to 7(e) can be used in a downlink subframe. CSI-RSs can be transmitted for 8 antenna ports (antenna port indices 15 to 22) additionally defined in LTE-A. CSI-RSs with respect to different antenna ports can be identified by being located in different frequency resources (subcarriers) and/or different time resources (OFDM symbols) (that is, multiplexed according to FDM and/or TDM). In addition, CSI-RSs with respect to different antenna ports, which are located in the same time-frequency resource, can be identified using an orthogonal code (i.e. multiplexed according to CDM). In FIG. 7(a), CSI-RSs with respect to antenna ports #15 and #16 can be located in REs represented as CSI-RS CDM group 1 and can be multiplexed using an orthogonal code. In addition, CSI-RSs with respect to antenna ports #17 and #18 can be located in REs represented as CSI-RS CDM group 2 and can be multiplexed using an orthogonal code. CSI-RSs with respect to antenna ports #19 and #20 can be located in REs represented as CSI-RS CDM group 3 and can be multiplexed using an orthogonal code. CSI-RSs with respect to antenna ports #21 and #22 can be located in REs represented as CSI-RS CDM group 4 and can be multiplexed using an orthogonal code. The principle described with reference to FIG. 7(a) can be equally applied to FIGS. 7(b) to 7(e).

RS patterns shown in FIGS. 5, 6 and 7 are exemplary and various embodiments of the present invention are not limited to specific RS patterns. That is, various embodiments of the present invention can be equally applied to a case in which an RS pattern different from those of FIGS. 5, 6 and 7 is defined and used.

CSI-RS Configuration

A CSI-RS configuration refers to a unit specified by association of transmission timing (i.e. subframeConfig) of a CSI-RS, an RE position (i.e. resourceConfig) of the CSI-RS in an RB pair and an antenna port related to the CSI-RS. Information on a CSI-RS configuration can be defined as an information element (IE) CSI-RS-Config and provided to a UE through higher layer (e.g. radio resource control (RRC) layer) signaling. Table 1 shows a CSI-RS-Config IE defined in the legacy wireless communication system.

Parameter subframeConfig corresponds to parameter $I_{CSI-RS}$ with respect to CSI-RS subframe periodicity $T_{CSR-RS}$ and CSI-RS subframe offset $\Delta_{CSI-RS}$. Parameter $I_{CSI-RS}$ can be defined as shown in Table 2.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Parameter zeroTxPowerResourceConfigList is a parameter with respect to a CSI-RS configuration having Tx power of 0 and zeroTxPowerSubframeConfig corresponds to

TABLE 1

```
-- ASN1START
CSI-RS-Config-r10 ::=       SEQUENCE {
    csi-RS-r10                  CHOICE {
        release                     NULL,
        setup                       SEQUENCE {
            antennaPortsCount-r10       ENUMERATED {an1, an2, an4, an8},
            resourceConfig-r10          INTEGER (0..31),
            subframeConfig-r10          INTEGER (0..154),
            p-C-r10                     INTEGER (-8..15)
        }
    }                                                               OPTIONAL, -- Need ON
    zeroTxPowerCSI-RS-10        CHOICE {
        release                     NULL,
        setup                       SEQUENCE {
            zeroTxResourceConfigList-r10    BIT STRING (SIZE 16)),
            zeroTxPowerSubframeConfig-r10   INTEGER (0..154)
        }
    }                                                               OPTIONAL -- Need ON
}
-- ASN1STOP
```

In Table 1, parameter antennaPortsCount indicates the number of antenna ports used for CSI-RS transmission. The number of CSI-RS antenna ports may be 1, 2, 4 or 8.

Parameter p-C (or $P_c$) indicates the ratio of CSI-RS EPRE (Energy Per Resource Element) to PDSCH EPRE on the assumption that a reference PDSCH is transmitted for calculation/generation of CSI by a UE. That is, parameter p-C (or $P_c$) corresponds to a value representing the ratio of CRS-RS Tx power to PDSCH Tx power in dB. $P_c$ refers to CSI-RS Tx power assumed by the UE in calculation of CSI (RI/PMI/CQI) rather than actual CSI-RS Tx power.

PDSCH EPRE in a corresponding symbol can be derived from $\rho_A$ provided by an eNB. The eNB determines downlink resource Tx power as an energy value per RE. Downlink resource Tx power assignment is performed on the basis of EPRE with respect to a CRS. EPRE with respect to a PDSCH resource region in which data is actually transmitted is represented as the ratio of PDSCH EPRE to CSI EPRE. For example, the ratio of PDSCH EPRE to CRS EPRE is defined as $\rho_A$ in an OFDM symbol period in which no CRS is present in the time domain in a downlink subframe and the ratio of PDSCH EPRE to CRS EPRE is defined as $\rho_B$ in an OFDM symbol period in which a CRS is present.

Parameter resourceConfig represents a CSI-RS allocation resource position. For example, the parameter can indicate one of the CSI-RS patterns shown in FIG. 7.

parameter $I_{CSI-RS}$ with respect to periodicity and offset of a subframe in which a CSI-RS having Tx power of 0 is transmitted.

Refer to standard document TS 36.331 v10.4.0 for more details of CRS-RS Configuration.

CSI-RS Sequence Generation

RS sequence $r_{l,n_s}(m)$ can be defined by Equation 1.

$$r_{l,n_s}(m) = \frac{1}{\sqrt{2}}(1 - 2 \cdot c(2m)) + j\frac{1}{\sqrt{2}}(1 - 2(2m+1)), \quad \text{[Equation 1]}$$

$$m = 0, 1, \ldots, N_{RB}^{max,DL} - 1$$

In Equation 1, $n_s$ is a slot number (or slot index) in a radio frame and l is an OFDM symbol number (or OFDM symbol index) in a slot. Pseudo-random sequence c(i) is defined as a length-31 Gold sequence. In generation of the pseudo-random sequence, an initialization value is given as $c_{init}$. Here, $c_{init}$ can be defined as represented by Equation 2.

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad \text{[Equation 2]}$$

In Equation 2, $n_s$ is a slot number (or slot index) in a radio frame and l is an OFDM symbol number (or OFDM symbol index) in a slot. $N_{ID}^{cell}$ a physical layer cell identifier and $N_{CP}$ is 1 in the case of normal CP and 0 in the case of extended CP.

Refer to standard document TS 36.211 v10.4.0 for more details of CRS-RS sequence generation.

Coordinated Multi-Point: CoMP

In order to meet the requirements of 3GPP LTE-A, coordinated multipoint (CoMP) transmission (referred to as co-MIMO, collaborative MIMO, network MIMO, etc.) has been proposed for system performance enhancement. CoMP can increase cell-edge UE performance and enhance average sector throughput.

In general, inter-cell interference (ICI) may reduce cell-edge UE performance and average sector throughput under a multi-cell environment with a frequency reuse factor of 1. To mitigate ICI, a simple passive technique, such as fractional frequency reuse (FFR) with UE specific power control has been employed in LTE in order to provide reasonable throughput performance for cell-edge UEs in an interference-limited environment. Instead of reducing frequency resource usage per cell, it is more beneficial to reuse ICI as a desired signal or mitigate the ICI. To accomplish the above object, CoMP transmission is applicable.

CoMP schemes applicable to downlink may be categorized into joint processing (JP) and coordinated scheduling/beamforming (CS/CB).

In JP, each point (eNB) of a CoMP coordination unit may use data. The CoMP coordination unit refers to a set of eNBs used for a coordinated transmission scheme. JP may be divided into joint transmission and dynamic cell selection.

Joint transmission refers to a scheme through which PDSCHs are simultaneously transmitted from a plurality of points (some or all CoMP coordination units). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE may be dynamically selected.

According to the CS/CB scheme, CoMP coordination units may collaboratively perform beamforming of data transmission to a single UE. Here, user scheduling/beaming may be determined according to coordination of cells in a corresponding CoMP coordination unit although data is transmitted only from a serving cell.

In case of uplink, coordinated multi-point reception refers to reception of a signal transmitted according to coordination among a plurality of points geographically spaced apart from one another. A CoMP reception scheme applicable to uplink may be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination among cells in a corresponding CoMP coordination unit while one point receives a PUSCH.

A UE can commonly receive data from multi-cell base stations using the CoMP system. In addition, base stations can simultaneously support one or more UEs using the same radio frequency resource to improve system performance. Furthermore, a base station may perform space division multiple access (SDMA) based on information on channel state between the base station and a UE.

A serving eNB and one or more coordinating eNBs can be connected to a scheduler through a backbone network in a CoMP system. The scheduler can operate on the basis of channel information about a channel state between each UE and each coordinating eNB, measured by each eNB, fed back thereto through the backbone network. For example, the scheduler can schedule information for coordinating MIMO operation for the serving eNB and one or more coordinating eNBs. That is, the scheduler can directly instruct each eNB to perform coordinated MIMO operation.

As described above, the CoMP system can be considered as a virtual MIMO system using a plurality of transmission points grouped into one group and MIMO using multiple antennas can be applied thereto.

Enhanced CSI-RS Transmission and Reception

CSI-RS configuration parameters are determined on the assumption that CSI-RSs according to a single CSI-RS configuration are transmitted from a single cell in the legacy wireless communication systems. In enhanced wireless communication systems supporting multi-cell transmission and reception such as CoMP operation, however, a conventional CSI-RS configuration scheme cannot be applied since CSI-RSs according to a single CSI-RS configuration may be transmitted from transmission ports (TPs) which are not physically identical. Accordingly, the present invention provides an enhanced CSI-RS configuration scheme. A description will be given of a method for transmitting and receiving a CIS-RS according to the enhanced CSI-RS configuration scheme.

While the term BS will be mainly used for convenience in the following description, the term can be replaced by the terms eNB, transmission point (TP), reception point (RP), remote radio head (RRH), relay, etc.

Method of Configuring $P_c$

The present invention can configure $P_c$ (i.e. value indicating the ratio of CSI-RS EPRE to PDSCH EPRE) per antenna port when a BS provides a CSI-RS configuration to a specific UE. Accordingly, the UE can calculate/generate CSI feedback information considering that antenna ports may have different degrees of boosting of CSI-EPRE with respect to PDSCH EPRE.

Figure 8:
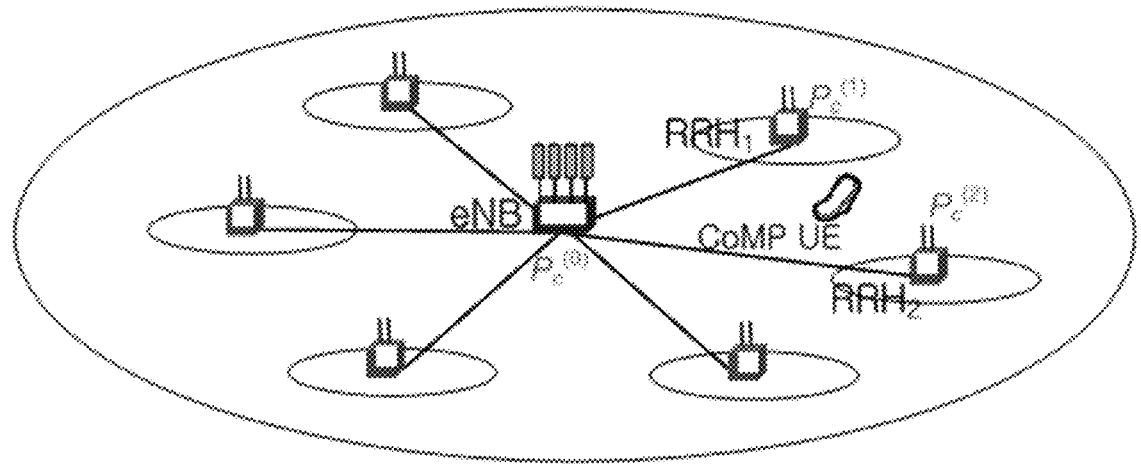
FIG. 8 illustrates a method for configuring $P_c$ per antenna port according to an embodiment of the present invention.

FIG. 8 illustrates an example to which the method of configuring $P_c$ per antenna port is applied.

In the example of FIG. 8, it is assumed that an eNB provides a CSI-RS configuration for 8 CSI-RS ports to a CoMP UE. Here, it is assumed that 4 of the 8 CSI-RS ports correspond to the eNB and two of the remaining 4 ports correspond to $RRH_i$ and the remaining two ports correspond to $RRH_2$. However, the CoMP UE cannot be aware of a TP that transmits a CSI-RS corresponding to each antenna port (or the TP transmitting the CSI-RS is transparent for the CoMP UE) even though the CoMP UE is provided with the CSI-RS configuration for the 8 CSI-RS ports. That is, the CoMP UE can calculate CSI feedback information by performing channel measurement with respect to the 8 CSI-RS ports even though the CoMp UE is not aware of a geographical position of a TP related to a specific port from among the 8 CSI-RS ports according to CSI-RS configuration.

When independent (or different) $P_c$ values are configured for respective CSI-RS antenna ports, gain of the CoMP operation of the CoMP UE can be enhanced. For example, according to definition of CSI-RS in the legacy wireless communication system, one $P_c$ value is applied to a CSI-RS port of the eNB, a port of $RRH_1$ and a port of $RRH_2$. Since the distance between the CoMP UE and the eNB, the distance between the CoMP UE and $RRH_1$ and the distance between the CoMP UE and RRH$_2$ are different from one another as shown in FIG. 8, a degree of boosting of CSI-RS EPRE of each antenna port with respect to PDSCH EPRE can be independently configured when CSI-RS Tx power for each antenna port is configured in consideration of a relative distance according to the present invention. For example, $P_c^{(0)}$ can be applied to antenna port(s) belonging to the eNB, $P_c^{(1)}$ can be applied to antenna port(s) belonging to RRH$_1$ and $P_c^{(2)}$ can be applied to antenna ports) belonging to RRH$_2$. Accordingly, the CoMP UE can calculate/generate correct CSI feedback information (e.g. RI, PMI and CQI) in consideration of CSI-RS Tx power per antenna port.

Figure 9:
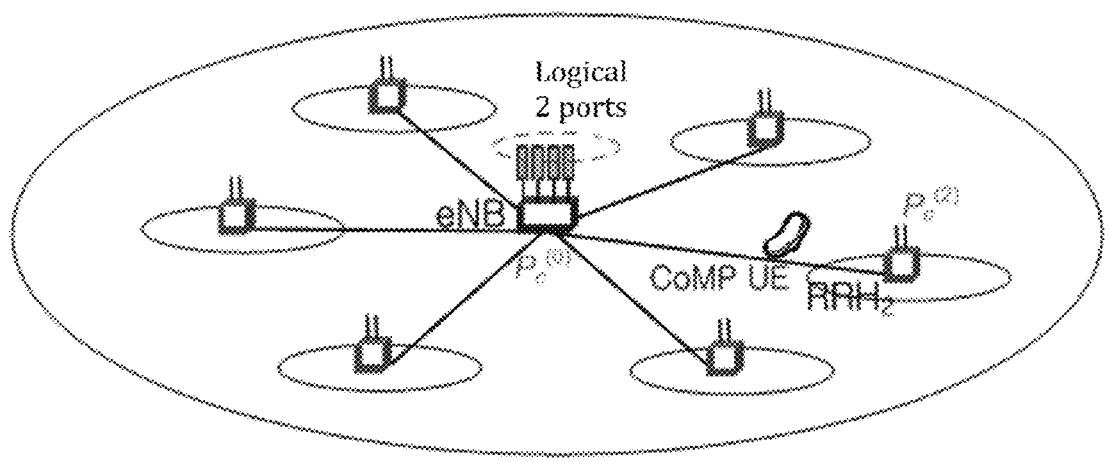
FIG. 9 illustrates a method for configuring $P_c$ per antenna port according to another embodiment of the present invention.

FIG. 9 illustrates another example to which the method of configuring $P_c$ per antenna port is applied.

In the example of FIG. 9, it is assumed that 4 CSI-RS ports are configured for a CoMP UE according to a single CSI-RS configuration. Here, even if the number of physical antennas of an eNB is 4, the number of logical antenna ports can be configured to 2. For example, mapping between physical antennas and logical antennas can be defined according to antenna virtualization. In the example of FIG. 9, two antenna ports belong to the eNB and the remaining two antenna ports belong to RRH$_2$.

Even in this case, $P_c$ can be configured per antenna port or antenna port group when a plurality of antenna ports is related to one CSI-RS configuration. For example, $P_c^{(0)}$ can be applied to the two logical antenna ports belonging to the eNB and $P_c^{(2)}$ can be applied to the two antenna ports belonging to RRH$_2$. Accordingly, the CoMP UE can reflect configuring (i.e. $P_c$) with respect to CSI-RS Tx power in calculation/generation of CSI feedback information based on a CSI-RS to perform more correct and efficient CSI feedback for CoMP operation.

According to the present invention, an independent value of $P_c$ can be configured per antenna port or antenna port group for a plurality of antenna ports related to a single CSI-RS configuration. This method can be usefully applied to a case in which a plurality of different TPs is related to a single CSI-RS configuration (e.g. a heterogeneous network environment in which a macro eNB and pico eNBs are related to a single CSI-RS configuration). For example, one $P_c$ value can be applied to antenna ports present in substantially the same geographical position and different $P_c$ values can be applied to antenna ports located in different geographical positions by limiting an antenna port group to antenna ports belonging to the same TP. $P_c$ may be configured per antenna port or antenna port group in the same TP.

The method of configuring $P_c$ per antenna port/antenna port group, provided by the present invention, can be implemented in such a manner that $P_c$ is defined per antenna port/antenna port group in the CSI-RS-Config IE of Table 1.

While cases in which one CSI-RS configuration is provided to one UE for 8 ports and 4 ports have been described in the aforementioned examples, the method of configuring $P_c$ is also applicable to a case in which one CIS-RS configuration is configured for 2 ports.

Method of Configuring a CSI-RS Sequence Generation Seed Value

The present invention can configure a scrambling seed value, which is used to generate a CSI-RS sequence, per antenna port or antenna port group when an eNB provides a CSI-RS configuration to a specific UE.

In a conventional wireless communication system, the same cell ID (e.g. $N_{ID}^{cell}$) is used to generate CSI-RS sequences for a plurality of antenna ports corresponding to one CSI-RS configuration, as described above with reference to Equation 2. As shown in the example of FIG. 8 or 9, different TPs having different cell IDs may be related to one CSI-RS configuration. In this case, a cell ID of a TP to which each antenna port belongs can be used as a scrambling seed value to generate a CSI-RS sequence of the corresponding antenna port in the present invention. In this case, the same scrambling seed value can be applied to antenna ports (or antenna port groups) belonging to the same TP.

For example, Equation 2 can be modified into Equation 3.

$$c_{init}=2^{10}\cdot(7\cdot(n_s+1)+l+1)\cdot(2\cdot X_{ID}^{cell}+1)+2\cdot X_{ID}^{cell}N_{CP} \quad \text{[Equation 3]}$$

In Equation 3, $N_{ID}^{cell}$ of t Equation 2 is replaced by $X_{ID}^{cell}$. $X_{ID}^{cell}$ represents a cell ID configured per antenna port (or antenna port group).

Method of Using Timing Offset

Figure 10:
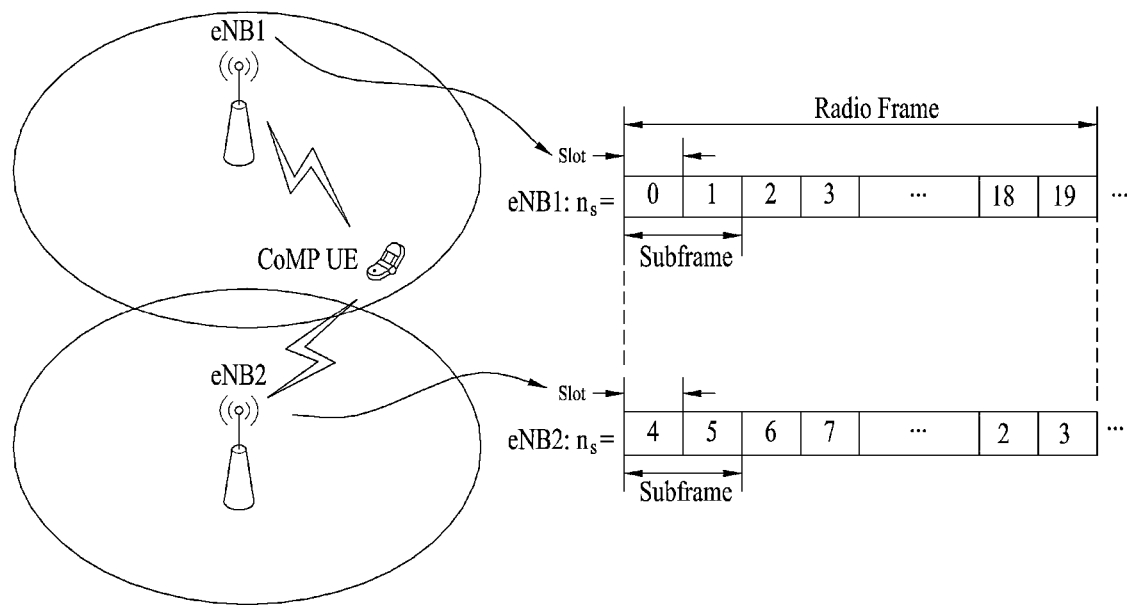
FIG. 10 illustrates operation of the present invention when TPs have different radio frame timings.

FIG. 10 illustrates an operation of the present invention when multiple TPs have different radio frame timings.

In the example of FIG. 10, a difference between radio frame timings (or offsets) of eNB1 and eNB2 corresponds to 4 slots. That is, timing of slot index 0 of a radio frame of eNB1 is aligned with timing of slot index 4 of a radio frame of eNB2.

Figure 12:
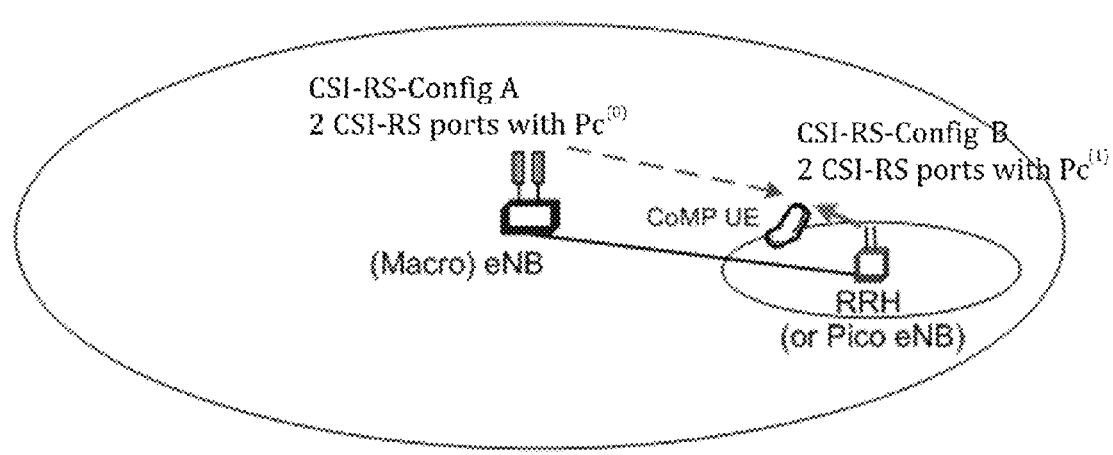
FIG. 12 illustrates an example to which multiple CSI-RS configurations are applied.

Slot indexes are not aligned with each other between neighbor cells (or TPs) when a specific signal/channel (important signal/channel transmitted only in a slot corresponding to a specific slot index, for example, a primary synchronization signal (PSS)/secondary synchronization signal (SSS), a physical broadcast channel (PBCH), etc.) is given offsets by neighbor eNBs such that the specific signal/channel is not transmitted from the neighbor eNBs at the same timing in enhanced inter-cell interference coordination (eICIC). In addition, to perform interference coordination in the time domain in eICIC, specific subframes can be configured to almost blank subframes (ABSs) or reduced-power ABSs (r-ABSs) according to a subframe bitmap pattern predefined in a specific cell (e.g. macro cell) to pre-set a subframe interval to which Tx power remarkably lower than Tx power in normal subframes is applied. Since intensity of interference applied to neighbor cells (e.g. pico cells) is very low in this interval, the neighbor cells (e.g. pico cells) may set different slot index offsets such that the aforementioned important signal/channel (PSS/SSS and PBCH) is transmitted in a low interference environment in the interval. For network coordination, slot index offsets can be configured between neighbor cells, as shown in FIG. 10. The scope of the present invention is not limited to the environment in which slot index offsets are configured between two cells, as shown in FIG. 12, and the present invention may be applied to environments in which all or some of three or more cells have different slot indices in case of CoMP operation of the three or more cells. The present invention provides a method for correctly performing CoMP operation and CSI-RS transmission/reception related operation when a timing offset between cells is applied.

When an eNB provides a CSI-RS configuration to a specific UE, the present invention can configure a factor considering radio frame timing in addition to a slot index (e.g. $n_s$ of Equation 2 or 3) used for CSI-RS sequence generation for each antenna port or antenna port group.

In conventional wireless communication systems, the same slot index $n_s$ is used to generate CSI-RS sequences for a plurality of antenna ports included in a single CIS-RS configuration, as described with reference to Equation 2. Meanwhile, one CIS-RS configuration may relate to a plurality of TPs and the TPs may have different radio frame timings (or slot offsets), as shown in FIG. 8. In this case, the present invention can additionally consider radio frame timing of a TP to which each antenna port belongs in generation of a CSI-RS sequence for the corresponding antenna port. Here, the same radio frame timing (or slot offset) may be applied to antenna ports (or antenna port groups) belonging to the same TP.

For example, Equation 3 can be modified into Equation 4.

$$c_{init}=2^{10}\cdot(7\cdot(\text{mod}((n_s+\Delta n_s),20)+1)+l+1)\cdot(2+X_{ID}^{cell}+1)+X_{ID}^{cell}\cdot N_{CP}$$ [Equation 4]

Equation 4 is obtained by replacing $n_s$ of Equation 3 by mod$((n_s+\Delta n_s), 20)$. Here, mod(A,B) refers to a modulo operation and represents the remainder obtained by dividing A by B. In Equation 4, $\Delta n_s$ denotes a radio frame timing offset configured per antenna port (or antenna port group). For example, the radio frame timing offset can be given as a relative offset value with respect to predetermined reference timing. The predetermined reference timing may be a radio frame timing offset of a serving cell.

For example, when radio frame timing of a TP that transmits a CSI-RS according to a CSI-RS configuration corresponds to the radio frame timing of the serving cell, $\Delta n_s$ can be configured to 0 in calculation of $c_{init}$ used to generate a CSI-RS sequence of the TP. In this case, the CSI-RS sequence can be generated according to slot index $n_s$ of the serving cell as in the conventional method.

If eNB1 is a serving cell of the CoMP UE in the example of FIG. 10, then $\Delta n_s$ can be configured to 4 in calculation of $c_{init}$ used to generate a CSI-RS sequence for an antenna port (or antenna port group) belonging to eNB2 having a slot index offset difference of 4 from eNB1.

Method of Configuring CSI-RS-Config IE

According to the aforementioned examples of the present invention, at least one TP can configure at least one of the CSI-RS Tx power parameter (i.e. $P_c$), the scrambling seed value (i.e. $X_{ID}^{cell}$) used for CSI-RS sequence generation and the timing offset value (i.e. $\Delta n_s$) used for CSI-RS sequence generation per antenna port (or antenna port group, TP or TP group) and transmit a CSI-RS according to the configured value. In addition, information about at least one of the CSI-RS Tx power parameter (i.e. $P_c$), the scrambling seed value (i.e. $X_{ID}^{cell}$) used for CSI-RS sequence generation and the timing offset value (i.e. $\Delta n_s$) used for CSI-RS sequence generation, configured per antenna port (or antenna port group, TP or TP group), is provided to a UE such that the UE can receive the CSI-RS without error.

A description will be given of a method for configuring higher layer signaling for providing the aforementioned CSI-RS configuration related parameters (e.g. Pc, $X_{ID}^{cell}$, $\Delta n_s$ and/or an additional CSI-RS configuration parameter which will be described below) to a UE.

CSI-RS-Config IE in Table 1 can be modified as shown in Table 3.

TABLE 3

```
-- ASN1START
CSI-RS-Config-r11 ::=    SEQUENCE {
    csi-RS-r11                  CHOICE {
        release                     NULL,
        setup                       SEQUENCE {
            antennaPortsCount-r11       ENUMERATED {an1, an2, an4, an8},
            resourceConfig-r11          INTEGER (0..31),
            subframeConfig-r11          INTEGER (0..154),
            p-C-r11-1                   INTEGER (-8..15),
            p-C-r11-2                   INTEGER (-8..15),
            ...
            p-C-r11-anN                 INTEGER (-8..15),
            X-ID-r11-1                  INTEGER ( ... ),
            X-ID-r11-2                  INTEGER ( ... ),
            ...
            X-ID-r11-anN                INTEGER ( ... ),
            Delta-n-s-r11-1             INTEGER (0..19),
            Delta-n-s-r11-2             INTEGER (0..19),
            ...
            Delta-n-s-r11-anN           INTEGER (0..19),
        }
        ...
```

Table 3 shows that $P_c$, $X_{ID}^{cell}$ and $\Delta n_s$ are configured for each of a total of anN ports when antennaPortsCount-r11 is determined as anN (N=1, 2, 4, or 8). Specifically, p-C-r11-1, p-C-r11-2, . . . , p-C-r11-anN of $P_c$ values, X-ID-r11-1, X-ID-r11-2, . . . , X-ID-r11-anN of $X_{ID}^{cell}$ values and Delta-n-s-r11-1, Delta-n-s-r11-2, . . . , Delta-n-s-r11-anN of $\Delta n_s$ values are respectively allocated to port 1, port 2, . . . , port anN. When $P_c$, $X_{ID}^{cell}$ and $\Delta n_s$ are configured per CSI-RS port in this manner, a CSI-RS configuration having highest flexibility can be configured.

Alternatively, CSI-RS-Config IE in Table 1 can be modified as shown in Table 4.

TABLE 4

```
-- ASN1START
CSI-RS-Config-r11 ::=    SEQUENCE {
    csi-RS-r11                  CHOICE {
        release                     NULL,
```

TABLE 4-continued

| | | |
|---|---|---|
| setup | SEQUENCE { | |
|   antennaPortsCount-r11 | ENUMERATED {an1, an2, an4, an8}, | |
|   resourceConfig-r11 | INTEGER (0..31), | |
|   subframeConfig-r11 | INTEGER (0..154), | |
| p-Flag-1 | INTEGER (0, 1) | → Assume this value was 1, |
| p-C-r11-1 | INTEGER (−8..15), | → Then, p-C-r11-1 is allocated, |
| p-Flag-2 | INTEGER (0, 1) | → Assume this value was 0, (same p-C-r11-1 shall be used) |
| p-Flag-3 | INTEGER (0, 1) | → Assume this value was 0, (same p-C-r11-1 shall be used) |
| p-Flag-4 | INTEGER (0, 1) | → Assume this value was 0, (same p-C-r11-1 shall be used) |
| p-Flag-5 | INTEGER (0, 1) | → Assume this value was 1, |
| p-C-r11-2 | INTEGER (−8..15), | → Then, p-C-r11-2 is newly given, |
| p-Flag-6 | INTEGER (0, 1) | → Assume this value was 0, (same p-C-r11-2 shall be used) |
| p-Flag-7 | INTEGER (0, 1) | → Assume this value was 1, |
| p-C-r11-3 | INTEGER (−8..15), | → Then, p-C-r11-3 is newly given, |
| p-Flag-8 | INTEGER (0, 1) | → Assume this value was 0, (same p-C-r11-3 shall be used) |
| x-Flag-1 | INTEGER (0, 1) | → Assume this value was 1, |
| X-ID-r11-1 | INTEGER ( ... ), | → Then, X-ID-r11-1 is allocated, |
| x-Flag-2 | INTEGER (0, 1) | → Assume this value was 0, (same X-ID-r11-1 shall be used) |
| x-Flag-3 | INTEGER (0, 1) | → Assume this value was 0, (same X-ID-r11-1 shall be used) |
| x-Flag-4 | INTEGER (0, 1) | → Assume this value was 0, (same X-ID-r11-1 shall be used) |
| x-Flag-5 | INTEGER (0, 1) | → Assume this value was 1, |
| X-ID-r11-2 | INTEGER ( ... ), | → Then, X-ID-r11-2 is newly given, |
| x-Flag-6 | INTEGER (0, 1) | → Assume this value was 0, (same X-ID-r11-2 shall be used) |
| x-Flag-7 | INTEGER (0, 1) | → Assume this value was 1, |
| X-ID-r11-3 | INTEGER ( ... ), | → Then, X-ID-r11-3 is newly given, |
| x-Flag-8 | INTEGER (0, 1) | → Assume this value was 0, (same X-ID-r11-3 shall be used) |
| D-Flag-1 | INTEGER (0, 1) | → Assume this value was 1, |
| Delta-n-s-r11-1 | INTEGER (0..19), | → Then, Delta-n-s-r11-1 is allocated, |
| D-Flag-2 | INTEGER (0, 1) | → Assume this value was 0, (same Delta-n-s-r11-1 shall be used) |
| D-Flag-3 | INTEGER (0, 1) | → Assume this value was 0, (same Delta-n-s-r11-1 shall be used) |
| D-Flag-4 | INTEGER (0, 1) | → Assume this value was 0, (same Delta-n-s-r11-1 shall be used) |
| D-Flag-5 | INTEGER (0, 1) | → Assume this value was 1, |
| Delta-n-s-r11-2 | INTEGER (0..19), | → Then, Delta-n-s-r11-2 is newly given, |
| D-Flag-6 | INTEGER (0, 1) | → Assume this value was 0, (same Delta-n-s-r11-2 shall be used) |
| D-Flag-7 | INTEGER (0, 1) | → Assume this value was 1, |
| Delta-n-s-r11-3 | INTEGER (0..19), | → Then, Delta-n-s-r11-3 is newly given, |
| D-Flag-8 | INTEGER (0, 1) | → Assume this value was 0, (same Delta-n-s-r11-3 shall be used) |

Table 4 shows a method for configuring the IE more efficiently in consideration of a case in which $P_c$, $X_{ID}^{cell}$ or $\Delta n_s$ can have a common value for a plurality of ports, distinguished from Table 3 showing the method of configuring $P_c$, $X_{ID}^{cell}$ and $\Delta n_s$ per port. That is, a rule can be defined in such a manner that one flag bit is provided per antenna port, $P_c$, $X_{ID}^{cell}$ or $\Delta n_s$ for antenna port p−1 is equally applied to antenna port p when the flag bit corresponding to antenna port p is 0, and a new value of $P_c$, $X_{ID}^{cell}$ or $\Delta n_s$ is applied to antenna port p irrespective of $P_c$, $X_{ID}^{cell}$ or $\Delta n_s$ for antenna port p−1 when the flag bit corresponding to antenna port p is 1 in order to prevent the same value from being unnecessarily assigned to antenna ports. Accordingly, flag bit 0 is not followed by $P_c$, $X_{ID}^{cell}$ or $\Delta n_s$ and flag bit 1 is followed by $P_c$, $X_{ID}^{cell}$ or $\Delta n_s$ in a bit stream with respect to a corresponding antenna port.

It is possible to consider the example of FIG. 8 in which 4 antenna ports belonging to the eNB have first common $P_c$, $X_{ID}^{cell}$ and $\Delta n_s$, 2 antenna ports belonging to $RRH_1$ have second common $P_c$, $X_{ID}^{cell}$ and $\Delta n_s$ and 2 antenna ports belonging to $RRH_2$ have third common $P_c$, $X_{ID}^{cell}$ and $\Delta n_s$ as a normal case. Accordingly, bit indication overhead can be remarkably reduced by indicating whether $P_c$, $X_{ID}^{cell}$ or $\Delta n_s$ for each antenna port is different from that with respect to the immediately previous antenna port using 1-bit flag information and explicitly signaling the value only when the value is different from that with respect to the immediately previous antenna port rather than explicitly indicating $P_c$, $X_{ID}^{cell}$ or $\Delta n_s$ for all antenna ports as shown in Table 3.

According to another embodiment of the present invention, CSI-RS-Config IE in Table 1 can be modified as shown in Table 5.

TABLE 5

| | | |
|---|---|---|
| -- ASN1START | | |
| CSI-RS-Config-r11 ::= | SEQUENCE { | |
|   csi-RS-r11 | CHOICE { | |
|     release | NULL, | |
|     setup | SEQUENCE { | |
|       antennaPortsCount-r11 | ENUMERATED {an1, an2, an4, an8}, | |
|       resourceConfig-r11 | INTEGER (0..31), | |
|       subframeConfig-r11 | INTEGER (0..154), | |
|       Flag-1 | INTEGER (0, 1) | → Assume this value was 1, |
|       p-C-r11-1 | INTEGER (−8..15), | → Then, p-C-r11-1 is allocated, |
|       X-ID-r11-1 | INTEGER ( ... ), | → Then, X-ID-r11-1 is allocated, |
|       Delta-n-s-r11-1 | INTEGER (0..19), | → Then, Delta-n-s-r11-1 is allocated, |
|       Flag-2 | INTEGER (0, 1) | → Assume this value was 0, (same values shall be used) |
|       Flag-3 | INTEGER (0, 1) | → Assume this value was 0, (same values shall be used) |
|       Flag-4 | INTEGER (0, 1) | → Assume this value was 0, (same values shall be used) |
|       Flag-5 | INTEGER (0, 1) | → Assume this value was 1, |
|       p-C-r11-2 | INTEGER (−8..15), | → Then, p-C-r11-2 is newly given, |

TABLE 5-continued

| | | |
|---|---|---|
| X-ID-r11-2 | INTEGER ( ... ), | → Then, X-ID-r11-2 is newly given, |
| Delta-n-s-r11-2 | INTEGER (0..19), | → Then, Delta-n-s-r11-2 is newly given, |
| Flag-6 | INTEGER (0, 1) | → Assume this value was 0, (same values shall be used) |
| Flag-7 | INTEGER (0, 1) | → Assume this value was 1, |
| p-C-r11-3 | INTEGER (−8..15), | → Then, p-C-r11-3 is newly given, |
| X-ID-r11-3 | INTEGER ( ... ), | → Then, X-ID-r11-3 is newly given, |
| Delta-n-s-r11-3 | INTEGER (0..19), | → Then, Delta-n-s-r11-3 is newly given, |
| Flag-8 | INTEGER (0, 1) | → Assume this value was 0, (same values shall be used) |

Table 5 shows a method of allocating a set of $P_c$, $X_{ID}^{cell}$ and $\Delta n_s$ for a single antenna port. That is, instead of one of $P_c$, $X_{ID}^{cell}$ and $\Delta n_s$, a set of $P_c$, $X_{ID}^{cell}$ and $\Delta n_s$ is configured per antenna port (or antenna port group) in a CSI-RS configuration (or CRI-RS resource). This method may be useful when $P_c$, $X_{ID}^{cell}$ and $\Delta n_s$ configured for a specific antenna port (or antenna port group) are simultaneously changed or not when a plurality of TPs relates to one CSI-RS configuration (i.e. TP-shared CSI-RS configuration) as in the example of FIG. 8. Accordingly, more efficient bit indication can be performed according to the method shown in Table 5, compared to the method of respectively indicating $P_c$, $X_{ID}^{cell}$ and $\Delta n_s$ per antenna port as shown in Table 4. In addition, Table 5 shows that one flag bit per antenna port indicates whether a set of $P_c$, $X_{ID}^{cell}$ and $\Delta n_s$ with respect to the corresponding antenna port differs from that with respect to the previous antenna port and a new set of $P_c$, $X_{ID}^{cell}$ and $\Delta n_s$ is applied only when the set of $P_c$, $X_{ID}^{cell}$ and $\Delta n_s$ with respect to the corresponding antenna port differs from that with respect to the previous antenna port.

In the examples of Tables 4 and 5, the initial flag bit (i.e. flag bit for antenna port 1) may be omitted. This is because the flag bit for antenna port #1 is always 1 since a new value of $P_c$, $X_{ID}^{cell}$ or $\Delta n_s$ needs to be always configured for antenna port #1 because there is no $P_c$, $X_{ID}^{cell}$ or $\Delta n_s$ for the antenna port prior to antenna port #1. For example, p-Flag-1, x-Flag-1 and D-Flag-1 can be omitted in Table 4 and Flag-1 can be omitted in Table 5.

Figure 11:
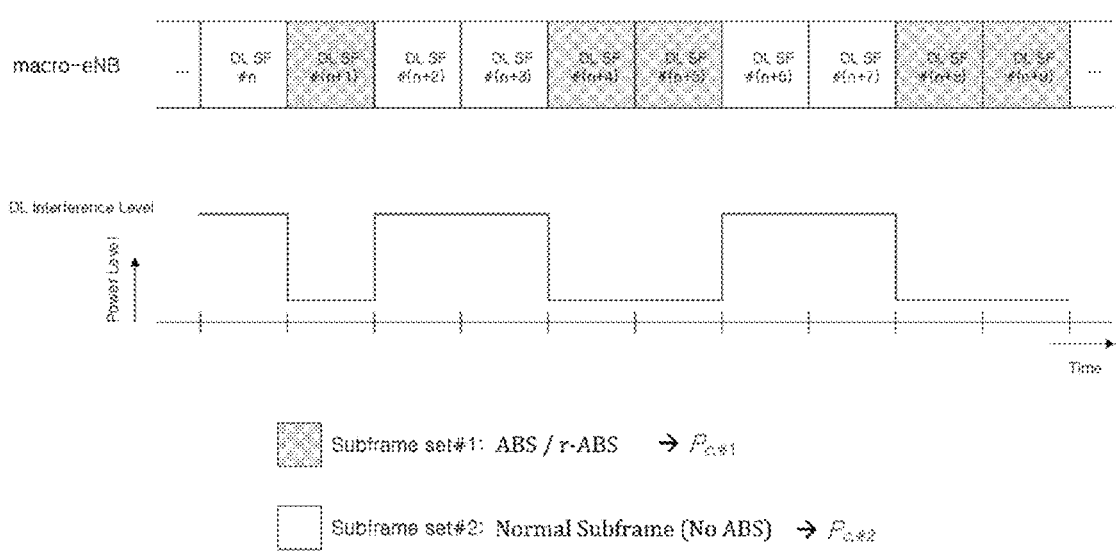
FIG. 11 illustrates an exemplary interference level and subframe configuration in an eICIC environment.

FIG. 11 illustrates an exemplary interference level and subframe configuration in an eICIC environment.

It is assumed that the macro eNB is an aggressor cell that causes interference and an RRH (or pico eNB) is a victim cell to which interference is applied in the network deployment environment as shown in FIG. 8. In this case, the macro eNB can configure a specific subframe to an ABS or r-ABS in which Tx power is remarkably reduced. In the example of FIG. 11, subframe set #1 corresponds to a set of subframes configured by the macro eNB to ABSs or r-ABSs and subframe set #2 corresponds to a set of normal subframes which are not configured by the macro eNB to ABSs. In addition, a downlink interference level caused by the macro eNB in subframes (i.e. ABSs or r-ABSs) belonging to subframe set #1 is remarkably lower than a downlink interference level in subframes (i.e. normal subframes) belonging to subframe set #2 in the example of FIG. 11. That is, subframe sets #1 and #2 can be considered to have different interference characteristics.

When subframes (or subframe sets) have different downlink Tx powers of a specific TP as in the example of FIG. 11, it is necessary to configure independent (or different) CSI-RS Tx power parameters for respective subframes (or subframe sets).

The CSI-RS Tx power parameter (i.e. PO according to the present invention can be independently configured per antenna port (or antenna port group) as described above and, separately or simultaneously, configured per subframe (or subframe set). For example, $P_{c,\#1}$ can be applied to subframe set #1 and $P_{c,\#2}$ can be applied to subframe set #2 in the example of FIG. 11.

A method of configuring CSI-RS-Config IE for applying $P_c$ per subframe set is shown in Table 6.

TABLE 6

| | | |
|---|---|---|
| -- ASN1START | | |
| CSI-RS-Config-r11 ::= | SEQUENCE { | |
| csi-RS-r11 | CHOICE { | |
| release | NULL, | |
| setup | SEQUENCE { | |
| antennaPortsCount-r11 | ENUMERATED {an1, an2, an4, an8}, | |
| resourceConfig-r11 | INTEGER (0..31), | |
| subframeConfig-r11 | INTEGER (0..154), | |
| Flag-1 | INTEGER (0, 1) | → Assume this value was 1, |
| p-C-set1-r11-1 | INTEGER (−8..15), | → Then, p-C-set1-r11-1 is allocated, |
| p-C-set2-r11-1 | INTEGER (−8..15), | → Then, p-C-set2-r11-1 is allocated, |
| X-ID-r11-1 | INTEGER ( ... ), | → Then, X-ID-r11-1 is allocated, |
| Delta-n-s-r11-1 | INTEGER (0..19), | → Then, Delta-n-s-r11-1 is allocated, |
| Flag-2 | INTEGER (0, 1) | → Assume this value was 0, (same values shall be used) |
| Flag-3 | INTEGER (0, 1) | → Assume this value was 0, (same values shall be used) |
| Flag-4 | INTEGER (0, 1) | → Assume this value was 0, (same values shall be used) |
| Flag-5 | INTEGER (0, 1) | → Assume this value was 1, |
| p-C-set1-r11-2 | INTEGER (−8..15), | → Then, p-C-set1-r11-2 is newly given, |
| p-C-set2-r11-2 | INTEGER (−8..15), | → Then, p-C-set2-r11-2 is newly given, |
| X-ID-r11-2 | INTEGER ( ... ), | → Then, X-ID-r11-2 is newly given, |
| Delta-n-s-r11-2 | INTEGER (0..19), | → Then, Delta-n-s-r11-2 is newly given, |
| Flag-6 | INTEGER (0, 1) | → Assume this value was 0, (same values shall be used) |
| Flag-7 | INTEGER (0, 1) | → Assume this value was 1, |
| p-C-set1-r11-3 | INTEGER (−8..15), | → Then, p-C-set1-r11-3 is newly given, |
| p-C-set2-r11-3 | INTEGER (−8..15), | → Then, p-C-set2-r11-3 is newly given, |
| X-ID-r11-3 | INTEGER ( ... ), | → Then, X-ID-r11-3 is newly given, |
| Delta-n-s-r11-3 | INTEGER (0..19), | → Then, Delta-n-s-r11-3 is newly given, |
| Flag-8 | INTEGER (0, 1) | → Assume this value was 0, (same values shall be used) |

Table 6 is an extension of Table 5 for application to the eICIC environment as shown in FIG. 11. That is, when the flag bit with respect to an antenna port is 1, a bit stream corresponding to Pc following the flag bit can include p-C-set1 corresponding to Pc with respect to subframe set #1 and p-C-set2 corresponding to Pc with respect to subframe set #2.

When two Pc values (p-C-set1 and p-C-set2) are signaled for each antenna port, information indicating which subframe sets are related to the different Pc values may be additionally provided to a UE when information (i.e. ABS pattern bitmap) indicating subframes and subframe sets is provided to the UE through higher layer signaling.

In generation/calculation of CSI feedback information (RI/PMI/CQI) using a CSI-RS, the UE can calculate CSI on the assumption of p-C-set1 or p-C-set2 in the corresponding CSI-RS configuration according to whether a specific subframe used for CSI calculation belongs to subframe set #1 or subframe set #2. In addition, the UE can additionally consider Pc in the specific subframe when calculating CSI feedback information in consideration of $P_c$, $X_{ID}^{cell}$ and $\Delta n_s$ which are configured per antenna port (or antenna port group).

Furthermore, in the method of independently configuring parameter $P_c$ per subframe (or subframe group) as described above, $P_c$ according to subframe set may be configured per antenna port (or antenna port group) in a CSI-RS configuration or per CSI-RS configuration (or CIS-RS resource). That is, when a plurality of CSI-RS configurations is provided, $P_c$ according to subframe set can be independently provided per CSI-RS configuration. Otherwise, $P_c$ according to subframe set is applied only in the time domain while a common $P_c$ parameter may be applied to all CSI-RS configurations. That is, a plurality of $P_c$ parameters is present in one CSI-RS configuration and has the same values in other CIS-RS configurations. Consequently, the same $P_c$ is applied to all CSI-RS ports. Which one of the plurality of $P_c$ parameters is applied can be determined according to a subframe set to which the corresponding subframe belongs.

Description with reference to FIG. 11 is exemplary and the present invention does not limit the number of subframe sets. That is, the principle of the present invention can be equally applied to a case in which three or more subframe sets are present and the CSI-RS Tx power parameter (i.e. PO is configured per subframe set.

According to another embodiment of the present invention, a parameter (e.g. resourceConfig parameter) for indicating a CSI-RS mapping resource position can be configured per antenna port (or antenna port group) in addition to the aforementioned parameters $P_c$, $X_{ID}^{cell}$ and $\Delta n_s$. In CSI-RS-Config IE shown in Tables 3 to 6, resourceConfig parameter as well as $P_c$, $X_{ID}^{cell}$ and $\Delta n_s$ can be independently configured per antenna port (or antenna port group). Furthermore, a flag bit indicating whether a parameter value with respect to a previous antenna port is applied to the current antenna port may be applied to resourceConfig parameter. Otherwise, resourceConfig parameter may be configured as a set with other parameters.

In addition, when $P_c$, $X_{ID}^{cell}$, $\Delta n_s$ and resourceConfig parameters are configured per antenna port (or antenna port group) as described above, a CSI-RS configuration can be configured for at least two antenna ports. This is because orthogonality between CSI-RS sequences cannot be secured when different parameters (e.g. $X_{ID}^{cell}$) are configured for CSI-RS ports 15 and 16 because CSI-RS ports 15 and 16 are multiplexed in CDM in the same RE. Accordingly, $P_c$, $X_{ID}^{cell}$, $\Delta n_s$ and resourceConfig parameters can be configured for antenna ports 15 and 16 as one unit such that the same parameter can be applied to antenna ports 15 and 16.

As an additional example, CSI-RS-Config IE of Table 1 can be modified as shown in Table 7.

TABLE 7

```
-- ASN1START
CSI-RS-Config-r11 ::=    SEQUENCE {
    csi-RS-r11           CHOICE {
        release          NULL,
        setup            SEQUENCE {
            subframeConfig-r11       INTEGER (0..154),
(sub-resource)
            {
            antennaPortsCount-r11    ENUMERATED {an2, an4,
                                                  an8},
            resourceConfig-r11       INTEGER (0..31),
            p-C-set1-r11-1 INTEGER (−8..15),
            p-C-set2-r11-1 INTEGER (−8..15),
            X-ID-r11-1       INTEGER ( ... ),
            Delta-n-s-r11-1  INTEGER (0..19),
            }
            ...
            {
            antennaPortsCount-r11    ENUMERATED {an2, an4,
                                                  an8},
            resourceConfig-r11       INTEGER (0..31),
            p-C-set1-r11-1 INTEGER (−8..15),
            p-C-set2-r11-1 INTEGER (−8..15),
            X-ID-r11-1       INTEGER ( ... ),
            Delta-n-s-r11-1  INTEGER (0..19),
            }
        ...
```

Table 7 shows a method for allocating parameters per sub-resource in a SCSI-RS configuration. For example, a sub-resource unit can be defined according to resourceConfig parameter indicating a CSI-RS allocation resource position in a CSI-RS configuration. In CSI-RS-Config IE, $P_c$, $X_{ID}^{cell}$ and $\Delta n_s$ can be allocated per sub-resource.

Specifically, only one subframeConfig-r11 parameter can be commonly present for a plurality of sub-resources in one CSI-RS configuration in the example of Table 7. Accordingly, although parameters such as $P_c$, $X_{ID}^{cell}$ and $\Delta n_s$ can be independently configured per sub-resource, the same CSI-RS transmission subframe periodicity and offset can be applied to the plurality of sub-resources.

As in the example of Table 7, antennaPortsCount-r11 and resourceConfig-r11 can be configured per sub-resource. That is, the number of antenna ports and CSI-RS allocation resource element position can be indicated per sub-resource. $P_c$, $X_{ID}^{cell}$ and $\Delta n_s$ allocated per sub-resource can be applied as common values for one sub-resource without using the flag bit as in the examples of Tables 4, 5 and 6.

In addition, the number of antenna ports is limited to at least two per sub-resource such that common $P_c$, $X_{ID}^{cell}$ and $\Delta n_s$ parameters can be configured in one antenna port group (i.e. at least two antenna ports). This secures orthogonality between CSI-RSs allocated in the same RE, as described above. If the number of antenna ports corresponding to one CSI-RS configuration is 8, then the number of antenna ports corresponding to one sub-resource can be limited to a maximum of 8. In Table 7, "antennaPortsCount-r11 ENUMERATED {an2, an4, an8}" represents that CSI-RS related parameters are commonly applied to at least two antenna ports and a maximum of 8 antenna ports in one sub-resource configuration.

As described above, various configurations of CSI-RS related parameters can be provided per sub-resource in one CSI-RS configuration. When a UE is provided with a CSI-RS configuration configured per sub-resource, the UE may calculate an RI, PMI and CQI for the CSI-RS configuration unit (i.e. a group of a plurality of sub-resources) in CSI feedback. That is, the UE can perform CSI measurement using parameters provided per sub-resource and calculate the RI, PMI and CQI based on the CIS-RS configuration unit in generation and calculation of CSI feedback information. Similarly to a method of using multiple CSI-RS configurations, which will be described later, the UE can generate/calculate CSI feedback information for one CSI-RS configuration by processing channel measurement results with respect to a plurality of sub-resources according to joint-aggregation.

Various methods for configuring one or a combination of two or more of the CSI-RS Tx power parameter (i.e. $P_c$), the scrambling seed value (i.e. $X_{ID}^{cell}$) used for CSI-RS sequence generation, the timing offset value (i.e. $\Delta n_s$) used for CSI-RS sequence generation and the parameter (i.e. resourceConfig) indicating an RE position in which a CSI-RS is present per CSI-RS configuration (or CSI-RS configuration group (i.e. a group of a plurality of CSI-RS configurations)), antenna port (or antenna port group), and/or subframe set have been described in the aforementioned examples. The scope of the present invention is not limited to the above-described examples and includes modifications of applying various combinations of configurations of CSI-RS related parameters (one or more of $P_c$, $X_{ID}^{cell}$, $\Delta n_s$ and resourceConfig) for various units (per CSI-RS configuration (group), antenna port (group) or subframe (group)). That is, the methods of configuring CSI-RS-Config IE, shown in Tables 3 to 7, are exemplary and CSI-RS-Config IE can be configured according to various embodiments or modifications of the present invention.

Method of Using Multiple CSI-RS Configurations

A UE can be provided with not only a CSI-RS configuration for CSI measurement and/or feedback with respect to a serving cell thereof but also a CSI-RS configuration for CSI measurement and/or feedback with respect to a neighbour cell for CoMP. That is, the UE can be provided with multiple CSI-RS configurations.

When multiple CSI-RS configurations are provided, at least one of the CSI-RS Tx power parameter (i.e. $P_c$) (including $P_c$ configured per subframe set), the scrambling seed value (i.e. $X_{ID}^{cell}$) used for CSI-RS sequence generation, the timing offset value (i.e. $\Delta n_s$) used for CSI-RS sequence generation and the parameter (i.e. resourceConfig) indicating an RE position in which a CSI-RS is present can be configured per CSI-RS configuration.

FIG. 12 illustrates an example to which multiple CSI-RS configurations are applied.

In the example of FIG. 12, CSI-RS configuration A with respect to a CSI-RS from an eNB (or macro eNB) and CSI-RS configuration B with respect to a CSI-RS from an RRH (or pico eNB) can be provided for one CoMP UE. CSI-RS configuration A represents that $P_c^{(0)}$ is configured for two CSI-RS ports of the macro eNB whereas CSI-RS configuration B represents that $P_c^{(1)}$ is configured for two CSI-RS ports of the pico eNB. That is, while the same number of antenna ports is configured in the multiple CSI-RS configurations (A and B), the ratio of CSI ERPE to PDSCH EPRE is configured differently for CSI-RS configurations A and B.

When multiple CSI-RS configurations are provided to one UE, as described above, the UE can generate and report CSI feedback information composed of a feedback report unit (or CSI feedback chain) per CSI-RS. Here, a feedback report unit (or CSI feedback chain) refers to a report of feedback information having various properties (e.g. RI, first PMI, second PMI, CQI, wideband PMI/CQI, subband PMI/CQI, etc.) and feedback information belonging to one feedback report unit corresponds to feedback information generated based on a commonly assumed CSI-RS.

Additionally or separately, the UE can combine multiple CSI-RS configurations (according to joint-aggregation, for example) to generate and report CSI feedback information according to one CSI feedback report unit (or CSI feedback chain). In the example of FIG. 12, the CoMP UE can combine CSI-RS configurations A and B to assume one virtual CSI-RS configuration, generate and report CSI feedback information according to one CSI feedback report unit (or CSI feedback chain) using CSI-RSs of 4 antenna ports specified by the virtual CSI-RS configuration. Here, when the UE generates CSI feedback information belonging to one CSI feedback report unit (or CSI feedback chain) by joint-aggregating multiple CSI-RS configurations, the UE can generate CSI feedback information using different parameters (e.g. $P_c^{(0)}$, $P_c^{(1)}$, ...) respectively configured for multiple CSI-RS configurations.

A description will be given of schemes in which the UE generates and reports CSI feedback information belonging to one CSI feedback report unit (or CSI feedback chain) in consideration of multiple CSI-RS configurations.

Scheme 1—The UE can be instructed to generate and report CSI feedback information in consideration of multiple CSI-RS configurations through a CSI feedback configuration. The CSI feedback configuration can be referred to as a feedback report mode and define properties of CSI feedback information to be reported (e.g. RI, first PMI, second PMI, CQI, wideband PMI/CQI, subband PMI/CQI, etc.) and a reporting order or reporting timing (i.e. feedback periodicity and offset). For example, when the CSI feedback configuration is signaled to the UE through RRC signaling, a CSI-RS configuration related to CSI feedback information to be reported according to the CSI feedback configuration can be indicated to the UE. For example, the UE may generate and report CSI feedback information belonging to one CSI feedback report unit (or CSI feedback chain) in consideration of only one CSI-RS configuration or generate and report CSI feedback information belonging to one CSI feedback report unit (or CSI feedback chain) in consideration of two or more CSI-RS configurations (or joint-aggregating the two or more CSI-RS configurations).

Scheme 2—The UE can be instructed to generate and report CSI feedback information in consideration of multiple CSI-RS configurations through higher layer signaling. The instruction information provided to the UE through higher layer signaling may be additionally defined in the IE (i.e. CSI-RS-Config) for CSI-RS configuration or provided through additional higher layer signaling. For example, an indication bit, which may be referred to an aggregation token, can be included in each CSI-RS configuration (or additional signal). It is assumed that the CoMP UE is individually provided with CSI-RS configurations A, B and C, the indication bit (e.g. aggregation token) included in CSI-RS configuration A is 3, the indication bit included in CSI-RS configuration B is 3 and the indication bit included in CSI-RS configuration C is 5. In generation and reporting of CSI feedback information, the CoMP UE can feed back joint-aggregated CSI for CSI-RS configurations A and B having the same aggregation token value and feed back separate CSI for CSI-RS configuration C. In addition, in CSI feedback configuration described in scheme 1, an indication bit such as the aggregation token of scheme 2 may be defined and used in the same manner.

Figure 13:
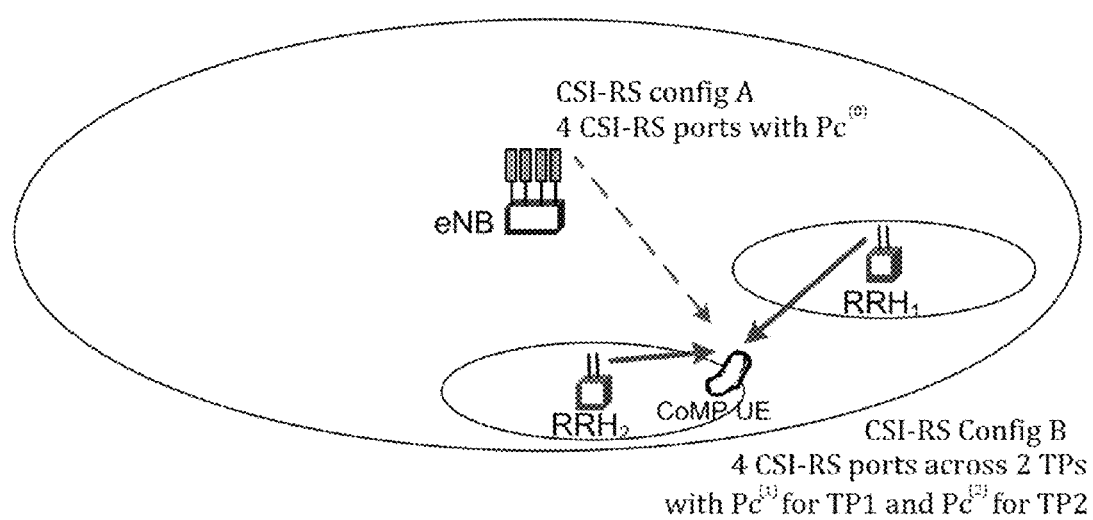
FIG. 13 illustrates a CSI-RS configuration according to an embodiment of the present invention.

FIG. 13 illustrates CSI-RS configurations according to an embodiment of the present invention.

The embodiment shown in FIG. 13 corresponds to a case in which one or more of the embodiments of the present invention, above-described with reference to FIGS. 8 to 12, are applied together. Specifically, a CoMP UE may be provided with CSI-RS configuration A related to an eNB. CSI-RS configuration A is related to 4 antenna ports and may be configured to $P_c^{(0)}$. In addition, the CoMP Ue may be provided with CSI-RS configuration B related to $RRH_1$ and $RRH_2$. CSI-RS configuration B is related to 4 antenna ports shared by 2 TPs (i.e. $RRH_1$ and $RRH_2$) and $P_c$ may be independently applied per TP in such a manner that $P_c^{(1)}$ is configured for ports related to $RRH_1$ and $P_c^{(2)}$ is configured for ports related to $RRH_2$.

The CoMP UE may be configured to perform CSI feedback for CSI-RS configuration A and to carry out separate CSI feedback for CSI-RS configuration B.

Otherwise, the CoMP UE may be configured to generate and report one piece of CSI feedback information by joint-aggregating CSI-RS configurations A and B. In this case, CSI feedback information for 8 CSI-RS ports can be calculated. That is, a PMI can be selected using an 8-Tx codebook and a CQI can be calculated based on the selected PMI. Even if the CoMP UE generates and reports one piece of CSI feedback information by joint-aggregating CSI-RS configurations A and B, the CoMP UE can generate/calculate joint CSI feedback information using an independent parameter indicated per antenna port (or per TP) in an individual CIS-RS configuration, such as $P_c^{(0)}$, $P_c^{(1)}$ and $P_c^{(2)}$.

While CSI feedback operation of the UE when $P_c$ is provided per CSI-RS configuration has been described in the embodiments shown in FIGS. 12 and 13, the scope of the present invention is not limited thereto and CSI feedback operation of the UE can be defined according to the same principle even when at least one of $P_c$, $X_{ID}^{cell}$, $\Delta_s$ and resourceConfig is independently configured per CSI-RS configuration, as described above.

In addition, while $P_c$ per CSI-RS antenna port (or antenna port group) (or $P_c$ applied per subframe set) may be configured per CSI-RS configuration, as described above, $P_c$ per CSI-RS antenna port may be configured per CSI process. Here, a CSI process is defined as association of a CSI-RS configuration and an IMR (interference measurement resource). Here, the CSI configuration of the CSI process refers to a CSI-RS resource (or CSI-RS configuration) with non-zero power for desired signal measurement and the IMR refers to a resource for interference measurement. When a plurality of CSI processes is present, each CSI process has an independent CSI feedback configuration. A CSI feedback configuration may be referred to as a feedback reporting mode and define properties of CSI feedback information (e.g. RI, first PMI, second PMI, CQI, wideband PMI/CQI, subband PMI/CQI, etc.), CSI feedback information reporting order or timing (i.e. feedback periodicity and offset), etc.

In addition, at least one of $P_c$, $X_{ID}^{cell}$, $\Delta n_s$ and resourceConfig may be configured per CSI process.

While the methods for efficiently supporting CoMP operation through CSI-RS configurations have been described, the scope of the present invention is not limited thereto and includes examples to which the same principle is applied for other RS configurations.

Figure 14:
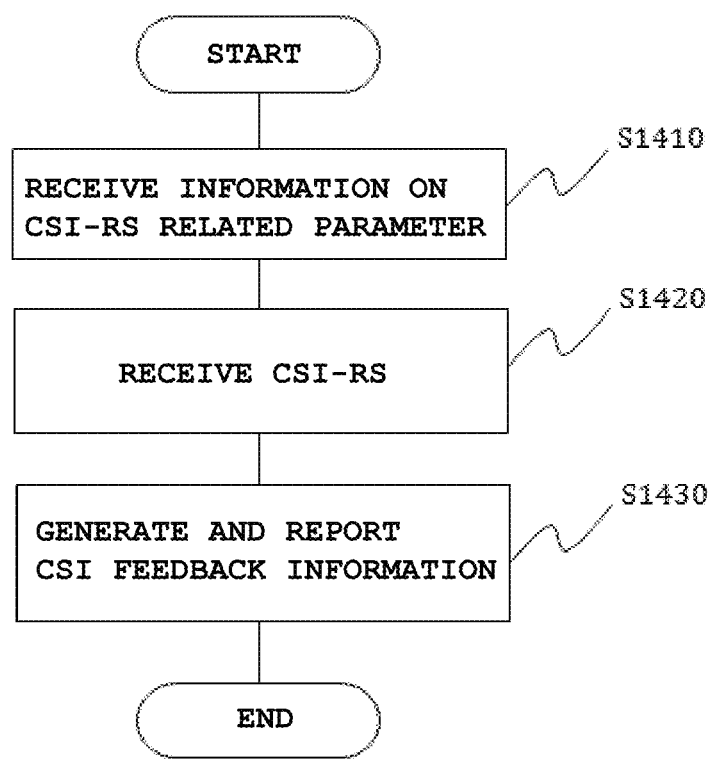
FIG. 14 is a flowchart illustrating a CSI feedback reporting method according to an embodiment of the present invention.

FIG. 14 is a flowchart illustrating a CSI feedback reporting method according to an embodiment of the present invention.

A UE may receive information on a CSI-RS related parameter from an eNB in step S1410. That is, the UE receives the CSI-RS-Config IE configured according to various embodiments of the present invention through higher layer signaling. For example, the CSI-RS related parameter can be independently applied per antenna port, antenna port group, TP, TP group or CSI-RS configuration. The CSI-RS related parameter may include at least one of a CSI-RS Tx power parameter (i.e. $P_c$) (including $P_c$ configured per subframe set), a scrambling seed value (i.e. $X_{ID}^{cell}$) used for CSI-RS sequence generation, a timing offset value (i.e. $\Delta n_s$) used for CSI-RS sequence generation and an RE position (i.e. resourceConfig) in which a CSI-RS is present.

The UE may receive a CSI-RS based on the CSI-RS related parameter in step S1420.

The UE may generate CSI feedback information using the received CSI-RS and report the CSI feedback information to the eNB in step S1430. In the operation of reporting the CSI-RS feedback information, the UE may calculate CSI per sub-resource in one CSI-RS configuration and report the CSI feedback information as one CSI feedback reporting unit for one CSI-RS configuration. When a plurality of CSI-RS configurations is provided to the UE, the UE may report the CSI feedback information as one CSI feedback report unit for the CSI-RS configurations according to joint aggregation.

The aforementioned embodiments of the present invention may be independently applied or two or more thereof may be simultaneously applied and description of redundant parts is omitted for clarity.

While an eNB is exemplified as a downlink transmsision entity or a uplink reception entity and a UE is exemplified as a downlink recpetion entity or an uplink transmission entity in description of various embodiments of the present invention, the scope of the present invention is not limited thereto. That is, the principle of the present invention, described through various embodiments of the present invention, can be equally applied to a case in which a relay is used as a downlink transmission entity for transmission to a UE or an uplink reception entity for reception from the UE or a case in which the relay is used as an uplink transmission entity for transmission to an eNB or a downlink reception entity for reception from the eNB.

Figure 15:
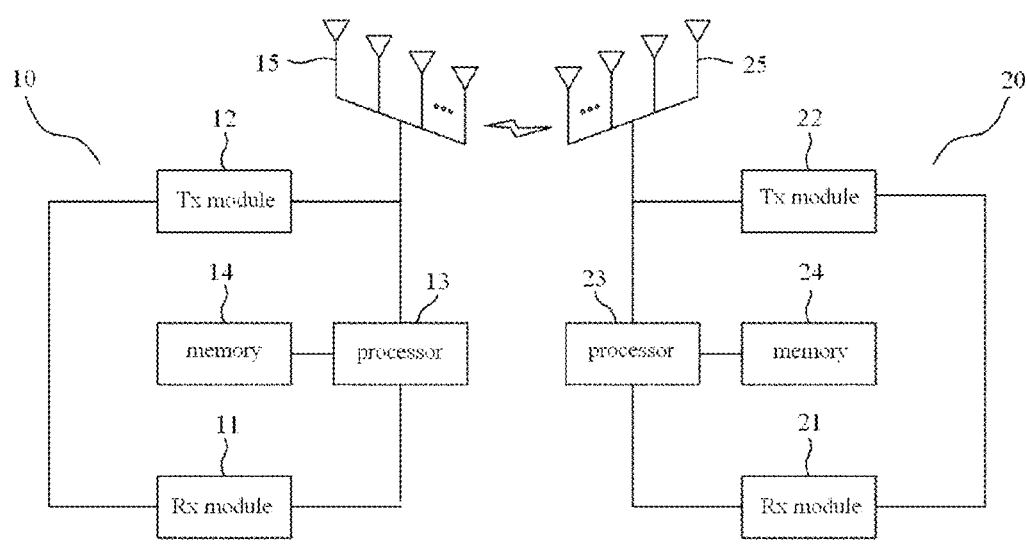
FIG. 15 illustrates configurations of a BS and a UE according to the present invention.

FIG. 15 illustrates configurations of a BS and a UE according to an embodiment of the present invention.

Referring to FIG. 15, the BS according to an embodiment of the present invention may include a transmitter 11, a receiver 12, a processor 13, a memory 14 and a plurality of antennas 15. The plurality of antennas refers to a BS supporting MIMO transmission and reception. The transmitter 11 may transmit signals, data and information to an external device (e.g. UE). The receiver 12 may receive signals, data and information from the external device (e.g. UE). The processor 13 may control the overall operation of the BS 10.

The BS 10 according to an embodiment of the present invention may be configured to transmit a CSI-RS to the UE and to receive CSI feedback information based on the CSI-RS. The processor 13 of the BS may be configured to transmit information about a CSI-RS related parameter to the UE using the transmitter 11. In addition, the processor 13 may be configured to transmit the CSI-RS based on the CSI-RS related parameter using the transmitter 11. The processor 13 may be configured to receive CSI feedback information, generated by the UE based on the CSI-RS, from the UE using the receiver 12.

The processor 13 of the BS 10 may process information received by the BS 10, information to be transmitted to an external device, etc. The memory 14 may store processed information for a predetermined time and may be replaced by a component such as a buffer (not shown).

Referring to FIG. 15, the UE 20 may include a transmitter 21, a receiver 22, a processor 23, a memory 24 and a plurality of antennas 25. The plurality of antennas 25 refers to a UE supporting MIMO transmission and reception. The transmitter 21 may transmit signals, data and information to an external device (e.g. BS). The receiver 22 may receive signals, data and information from the external device (e.g. BS). The processor 23 may control the overall operation of the UE 20.

The UE 20 according to an embodiment of the present invention may be configured to report CSI feedback information to the BS. The processor 23 of the UE may be configured to receive information on a CSI-RS related parameter through the receiver 22. In addition, the processor 23 may be configured to receive the CSI-RS based on the CSI-RS related parameter using the receiver 22. The processor 23 may be configured to report CSI feedback information, generated on the basis of the CSI-RS, to the BS using the transmitter 22.

The processor 23 of the UE 20 may process information received by the UE 20, information to be transmitted to an external device, etc. The memory 24 may store processed information for a predetermined time and may be replaced by a component such as a buffer (not shown).

In transmsision and reception of a CSI feedback report between the BS 10 and the UE 20, the CSI-RS related parameter may be independently applied per antenna port, antenna port group, TP, TP group or CSI-RS configuration. In addition, the CSI-RS related parameter may include at least one of a CSI-RS Tx power parameter (i.e. PO (including $P_c$ configured per subframe set), a scrambling seed value (i.e. $X_{ID}^{cell}$) used for CSI-RS sequence generation, a timing offset value (i.e. $\Delta n_s$) used for CSI-RS sequence generation and an RE position (i.e. resourceConfig) in which a CSI-RS is positioned. Furthermore, when the UE reports the CSI-RS feedback information, the UE may calculate CSI per sub-resource in one CSI-RS configuration and report the CSI feedback information as one CSI feedback report unit for one CSI-RS configuration. When a plurality of CSI-RS configurations is provided to the UE, the UE may report the CSI feedback information as one CSI feedback report unit for the CSI-RS configurations according to joint aggregation.

The aforementioned configurations of the BS 10 and the UE 20 can be implemented such that the aforementioned embodiments of the present invention are independently applied or two or more thereof are simultaneously applied and description of redundant parts is omitted for clarity.

Description of the BS 10 may be applied to a relay as a downlink transmission entity or an uplink reception entity and description of the UE 20 may be applied to a relay as an uplink transmission entity or a downlink reception entity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The aforementioned embodiments of the present invention can be applied to various mobile communication systems.

The invention claimed is:

1. A method for reporting channel state information (CSI) by a user equipment (UE) in a wireless communication system, the method comprising:
   receiving information on a CSI-reference signal (CSI-RS) related parameter that includes a scrambling seed value ($X_{ID}^{cell}$) a timing offset ($\Delta n_s$) and a parameter indicating a CSI-RS resource element position;
   receiving a CSI-RS on the basis of the CSI-RS related parameter; and
   reporting, to a base station (BS), CSI feedback information generated on the basis of the CSI-RS,
   wherein the CSI-RS related parameter is applied to one or more CSI-RS ports included in a single CSI-RS configuration,
   wherein the CSI-RS related parameter includes a plurality of ratio parameters indicating a first ratio of CSI-RS energy per resource element (EPRE) to physical downlink shared channel (PDSCH) EPRE per CSI-RS port, the first ratio being different from a second ratio of a cell-specific RS (CRS) EPRE to PDSCH EPRE,
   wherein the CSI feedback information is generated by compensating different power boosting levels of the CSI-RS ports based on the plurality of ratio parameters, and
   wherein an initial value ($c_{init}$) for the CSI-RS corresponds to an equation $c_{init}=2^{10} \cdot (7 \cdot (mod((n_s+\Delta n_s),20)+1)+l+1) \cdot (2 \cdot X_{ID}^{cell}+1)+2 \cdot X_{ID}^{cell}+N_{CP}$, where $n_s$ is a slot number in a radio frame, l is an OFDM symbol number in a slot, $N_{CP}$ is 1 in case of normal cyclic prefix (CP) and 0 in case of extended CP, and mod denotes a modulo operation.

2. The method according to claim 1,
wherein the plurality of ratio parameters includes first and second ratio parameters,
wherein the first and second ratio parameters are respectively applied to first and second subframe sets,
wherein the first and second subframe sets have different interference characteristics.

3. The method according to claim 1, wherein the CSI-RS related parameter is independently applied per CSI-RS port or antenna port group included in the CSI-RS configuration.

4. The method according to claim 1, wherein the CSI-RS related parameter is independently applied to each of a plurality of sub-resources included in the CSI-RS configuration,
wherein each of the sub-resources is identified by a position of a resource element to which the CSI-RS is mapped.

5. The method according to claim 1, wherein the CSI-RS related parameter is applied as a same value to ports corresponding to a same transmission port (TP) or a TP group, from among the one or more CSI-RS ports included in the CSI-RS configuration.

6. The method according to claim 1, wherein, when a plurality of CSI-RS configurations are provided to the UE, the CSI-RS related parameter is independently applied to each of the plurality of CSI-RS configurations.

7. The method according to claim 1, wherein, when a plurality of CSI processes are configured for the UE, the CSI-RS related parameter is independently applied to each of the plurality of CSI processes.

8. The method according to claim 1, wherein the information on the CSI-RS related parameter includes a flag bit for each of the CSI-RS ports included in the CSI-RS configuration,
wherein the flag bit for CSI-RS port p indicates whether the CSI-RS related parameter for CSI-RS port p-1 is equally applied to CSI-RS port p.

9. The method according to claim 8, wherein the flag bit is defined for each of the CSI-RS related parameters or a set of the CSI-RS related parameters.

10. The method according to claim 1, wherein the CSI feedback information is configured as one CSI feedback report unit for one CSI-RS configuration.

11. The method according to claim 1, wherein, when a plurality of CSI-RS configurations are provided to the UE, the CSI feedback information is configured as one CSI feedback report unit for the plurality of CSI-RS configurations.

12. The method according to claim 1, wherein the information on the CSI-RS related parameter is received through higher layer signaling.

13. A user equipment (UE) reporting channel state information (CSI), comprising:
a receiver;
a transmitter; and
a processor,
wherein the processor is configured to receive information on a CSI-reference signal (CSI-RS) related parameter through the receiver, the CSI-RS related parameter including a scrambling seed value ($X_{ID}^{cell}$) a timing offset ($\Delta n_s$) and a parameter indicating a CSI-RS resource element position, to receive a CSI-RS on the basis of the CSI-RS related parameter through the receiver and to report, to a base station (BS) through the transmitter, CSI feedback information generated on the basis of the CSI-RS,
wherein the CSI-RS related parameter is applied to one or more CSI-RS ports included in a CSI-RS configuration,
wherein the CSI-RS related parameter includes a plurality of ratio parameters indicating a first ratio of CSI-RS energy per resource element (EPRE) to physical downlink shared channel (PDSCH) EPRE per CSI-RS port, the first ratio being different from a second ratio of a cell-specific RS (CRS) EPRE to PDSCH EPRE,
wherein the CSI feedback information is generated by compensating different power boosting levels of the CSI-RS ports based on the plurality of ratio parameters, and
wherein an initial value ($c_{init}$) for the CSI-RS corresponds to an equation $c_{init}=2^{10} \cdot (7 \cdot (\mod((n_s+\Delta n_s),20)+1)+l+1) \cdot (2 \cdot X_{ID}^{cell}+1)+2 \cdot X_{ID}^{cell}+N_{CP}$, where $n_s$ is a slot number in a radio frame, l is an OFDM symbol number in a slot, $N_{CP}$ is 1 in case of normal cyclic prefix (CP) and 0 in case of extended CP, and mod denotes a modulo operation.

* * * * *